US011276231B2

(12) United States Patent
Chandran et al.

(10) Patent No.: US 11,276,231 B2
(45) Date of Patent: Mar. 15, 2022

(54) SEMANTIC DEEP FACE MODELS

(71) Applicants: DISNEY ENTERPRISES, INC., Burbank, CA (US); ETH Zürich (Eidgenössische Technische Hochschule Zürich), Zürich (CH)

(72) Inventors: Prashanth Chandran, Zurich (CH); Dominik Thabo Beeler, Egg (CH); Derek Edward Bradley, Zurich (CH)

(73) Assignees: DISNEY ENTERPRISES, INC., Burbank, CA (US); ETH ZÜRICH, (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 0 days.

(21) Appl. No.: 16/809,495

(22) Filed: Mar. 4, 2020

(65) Prior Publication Data

US 2021/0279956 A1    Sep. 9, 2021

(51) Int. Cl.
*G06T 17/20*    (2006.01)
*G06K 9/00*    (2006.01)
*G06T 13/40*    (2011.01)

(52) U.S. Cl.
CPC .......... *G06T 17/20* (2013.01); *G06K 9/00268* (2013.01); *G06K 9/00308* (2013.01); *G06T 13/40* (2013.01)

(58) Field of Classification Search
CPC ......... G06T 13/20; G06T 13/40; G06T 17/20; G06T 17/205; G06K 9/00221–00315; G06K 2009/00328
See application file for complete search history.

(56) References Cited

U.S. PATENT DOCUMENTS

2020/0234034 A1*    7/2020    Savchenkov ........... G06T 11/60

OTHER PUBLICATIONS

Jiang, Zi-Hang, et al. "Disentangled representation learning for 3D face shape." Proceedings of the IEEE Conference on Computer Vision and Pattern Recognition. 2019. (Year: 2019).*

Zhu, Xiangyu, et al. "High-fidelity pose and expression normalization for face recognition in the wild." Proceedings of the IEEE conference on computer vision and pattern recognition. 2015. (Year: 2015).*

Abrevaya, Victoria Fernández, et al. "A generative 3D facial model by adversarial training." (2019). (Year: 2019).*

(Continued)

*Primary Examiner* — Diane M Wills
(74) *Attorney, Agent, or Firm* — Artegis Law Group, LLP

(57) ABSTRACT

Techniques are disclosed for training and applying nonlinear face models. In embodiments, a nonlinear face model includes an identity encoder, an expression encoder, and a decoder. The identity encoder takes as input a representation of a facial identity, such as a neutral face mesh minus a reference mesh, and outputs a code associated with the facial identity. The expression encoder takes as input a representation of a target expression, such as a set of blendweight values, and outputs a code associated with the target expression. The codes associated with the facial identity and the facial expression can be concatenated and input into the decoder, which outputs a representation of a face having the facial identity and expression. The representation of the face can include vertex displacements for deforming the reference mesh.

21 Claims, 15 Drawing Sheets

(56) References Cited

OTHER PUBLICATIONS

Abrevaya, Victoria Fernández, Stefanie Wuhrer, and Edmond Boyer. "Multilinear autoencoder for 3d face model learning." 2018 IEEE Winter Conference on Applications of Computer Vision (WACV). IEEE, 2018. (Year: 2018).*

Beeler et al., "High-quality single-shot capture of facial geometry", SIGGRAPH '10: ACM SIGGRAPH, papers Jul. 2010 Article No. 40 pp. 1-9.

Beeler et al., "Rigid stabilization of facial expressions", ACM Transactions on Graphics Jul. 2014 Article No. 44, 9 pages.

BLanz et al., "Exchanging Faces in Images" Computer Graphics Forum, Eurographics, vol. 23, 2004, No. 3, 8 pages.

Blanz et al., "A Morphable Model for The Synthesis of 3D Faces", In Proceedings of the 26th Annual Conference on Computer Graphics and Interactive Techniques, SIGGRAPH '99, pp. 187-194, New York, NY, USA, 1999. ACM Press/Addison-Wesley Publishing Co.

Booth et al., "A 3d morphable model learnt from 10,000 faces", 2016 IEEE Conference on Computer Vision and Pattern Recognition (CVPR), pp. 5543-5552.

Brunton et al., "Multilinear Wavelets: A Statistical Shape Space for Human Faces", CoRR, abs/1401.2818, Jul. 1, 2014, 10 pages.

Bulat et al., "How far are we from solving the 2d & 3d face alignment problem? (and a dataset of 230, 000 3d facial andmarks)", IEEE International Conference on Computer Vision, ICCV 2017, Oct. 22-29, 2017, pp. 1021-1030.

Cao et al., "3D Shape Regression for Real-time Facial Animation". ACM Transactions on Graphics, vol. 32, No. 4, Article 41, Jul. 2013, pp. 41:1-41:10.

Cao et al., "FaceWarehouse: a 3D Facial Expression Database for Visual Computing" IEEE Transactions on Visualization and Computer Graphics, vol. 20, No. 3, Mar. 2014, pp. 413-425.

Ferrari et al., "Dictionary Learning based 3d morphable model construction for face recognition with varying expression and pose", In Proceedings of the 2015 International Conference on 3D Vision, 3DV '15, IEEE Computer Society, pp. 509-517.

Gecer et al., "Synthesizing Coupled 3D Face Modalities by Trunk-Branch Generative Adversarial Networks", ArXiv, abs/1909.02215, Sep. 5, 2019, 11 pages.

Glorot et al., "Understanding the difficulty of training deep feedforward neural networks", Proceedings of the Thirteenth International Conference on Artificial Intelligence and Statistics, vol. 9, May 2010, pp. 249-256.

Goodfellow et al., "Generative adversarial nets", In Proceedings of the 27th International Conference on Neural Information Processing Systems—vol. 2, NIPS'14, , Cambridge, MA, USA, 2014. MIT Press, pp. 2672-2680.

Kingma et al., "Adam: A method for stochastic optimization", CoRR, abs/1412.6980, Dec. 22, 2014, 9 pages.

Kingma et al., "Auto-Encoding Variational Bayes", CoRR, abs/1312.6114, Dec. 20, 2013, 9 pages.

Lewis et al., "Practice and Theory of Blendshape Facial Models", In Sylvain Lefebvre and Michela Spagnuolo, editors, Eurographics 2014—State of the Art Reports. The Eurographics Association, 2014, pp. 1-23.

Li et al., Learning a model of facial shape and expression from 4D scans, ACM Transactions on Graphics, (Proc. SIGGRAPH Asia), vol. 36 No. 6, 2017, 58 pages.

Lipman et al., Linear rotation-invariant coordinates for Meshes. ACM Transactions on Graphics (Proceedings of ACM SIGGRAPH), vol. 24 No. 3, , 2005, pp. 479-487.

Neumann et al., "Sparse localized deformation components", ACM Transactions on Graphics, vol. 32, No. 6, Article 179, Nov. 2013, pp. 179:1-179:10.

Ranjan et al., "Generating 3D faces using Convolutional Mesh Autoencoders", In European Conference on Compute Vision (ECCV), volume Lecture Notes in Computer Science, vol. 11207, Jul. 26, 2018, pp. 725-741.

Blanco et al., "Facial retargeting with automatic range of motion alignment", ACM Transactions on Graphics, vol. 36, No. 4, Article 154, Jul. 2017, pp. 154:1-154:12.

Tan et al., "Variational Autoencoders for Deforming 3D Mesh Models", In Proceedings of the IEEE Computer Society Conference on Computer Vision and Pattern Recognition, 2018, 10 pages.

Thies et al., "Face2Face: Real-time Face Capture and Reenactment of RGB Videos", In Proceedings Computer Vision and Pattern Recognition (CVPR), IEEE, 2016, 9 pages.

Vlasic et al., "Face Transfer with Multilinear Models", ACM Transactions on Graphics, vol. 24 No. 3, Jul. 2005, pp. 126-433.

Wu et al., "An Anatomically-Constrained Local Deformation Model for Monocular Face Capture", ACM Trans. Graph., vol. 35, No. 4, Jul. 2016, Article 115, pp. 115:1-115:12.

Brunton et al., "Review of Statistical Shape Spaces for 3D Data with Comparative Analysis for Human Faces", Computer Vision and Image Understanding, 128:1-17, 2014, 21 pages.

Github, "Face-Parsing PyTorch", Retrieved from https://github.com/zllrunning/face-parsing.PyTorch, on Oct. 6, 2021, May 18, 2019, 4 pages.

Bas et al., "3D Morphable Models as Spatial Transformer Networks", IEEE International Conference on Computer Vision Workshops, DOI 10.1109/ICCVW.2017.110,2017, pp. 895-903.

Blanz et al., "Face Recognition Based on Fitting a 3D Morphable Model", IEEE Transactions on pattern analysis and machine intelligence, vol. 25, No. 9, Sep. 2003, pp. 1063-1074.

Burt et al., "A Multiresolution Spline With Application to Image Mosaics", ACM Transactions on Graphics, vol. 2, No. 1, Oct. 1983, pp. 217-236.

Chen et al., "SimSwap: An Efficient Framework For High Fidelity Face Swapping", In Proceedings of the 28th ACM International Conference on Multimedia, https://doi.org/10.1145/3394171.3413630, Oct. 12-16, 2020, pp. 2003-2011.

Feng et al., "Learning an Animatable Detailed 3D Face Model from In-The-Wild Images", arXiv:2012.04012, Dec. 7, 2020, pp. 1-22.

Feng et al., "Joint 3D Face Reconstruction and Dense Alignment with Position Map Regression Network", ECCV, Computer Vision Foundation, 2018, pp. 1-18.

Gu et al., "Geometry Images", In Proceedings of the 29th Annual Conference on Computer Graphics and Interactive Techniques, https://doi.org/10.1145/566570.566589, 2002, pp. 355-361.

Guo et al., "3DDFA", Retrieved from https://github.com/cleardusk/3DDFA, on Oct. 6, 2021, 2018, 15 pages.

Guo et al., "Towards Fast, Accurate and Stable 3D Dense Face Alignment", In Proceedings of the European Conference on Computer Vision (ECCV), arXiv:2009.09960, 2020, 22 pages.

Karras et al., "Progressive Growing of GANs for Improved Quality, Stability, and Variation", ICLR, http://arxiv.org/abs/1710.10196, Oct. 27, 2017, pp. 1-25.

Li et al., "Differentiable Monte Carlo Ray Tracing through Edge Sampling", ACM Trans. Graph., vol. 37, No. 6, Article 222, https://doi.org/10.1145/3272127.3275109, Nov. 2018, p. 222:1-222:11.

Liu et al., "Unsupervised Image-to-Image Translation Networks", In Advances in Neural Information Processing Systems 30, 2017, pp. 700-708.

Maruniec et al., "High-Resolution Neural Face Swapping for Visual Effects", Computer Graphics Forum, vol. 39, No. 1, DOI: 10 1111/cgf.14062,2020, pp. 173-184.

Mirkin et al., "FSGAN: Subject Agnostic Face Swapping and Reenactment", In Proceedings of the IEEE International Conference on Computer Vision, 2019, pp. 7184-7193.

Mirkin et al., "On Face Segmentation, Face Swapping, and Face Perception", 13th IEEE International Conference on Automatic Face & Gesture Recognition, DO110 1109/FG.2018 00024, 2018, pp. 98-105.

Paysan et al., "A 3D Face Model for Pose and Illumination Invariant Face Recognition", Advanced Video and Signal Based Surveillance, DOI 10.1109/AVSS.2009.58,2009, pp. 296-301.

Petrov et al., "DeepFaceLab: Integrated, flexible and extensible face-swapping framework", Retrieved from https://github.com/iperov/DeepFaceLab, arXiv:2005.05535, 2020, pp. 1-10.

(56) References Cited

OTHER PUBLICATIONS

Wang et al., "Pixel2Mesh: Generating 3D Mesh Models from Single RGB Images", In ECCV, Computer Vision Foundation, 2018, 16 pages.

Wang et al., "Image Quality Assessment: From Error Visibility to Structural Similarity", IEEE Transactions on Image Processing, vol. 13, No. 4, DOI 10.1109/TIP.2003 819861, Apr. 2004, pp. 600-612.

Yu et al., "BiSeNet: Bilateral Segmentation Network for Real-Time Semantic Segmentation", In Proceedings of the European Conference on Computer Vision (ECCV), https://doi.org/10.1007/978-3-030-01261-8_20, 2018, pp. 334-349.

Zhu et al., "Face Alignment in Full Pose Range: A 3D Total Solution", IEEE Transactions on Pattern Analysis and Machine, DOI 10.1109/TPAMI.2017.2778152, 2017, 14 pages.

\* cited by examiner

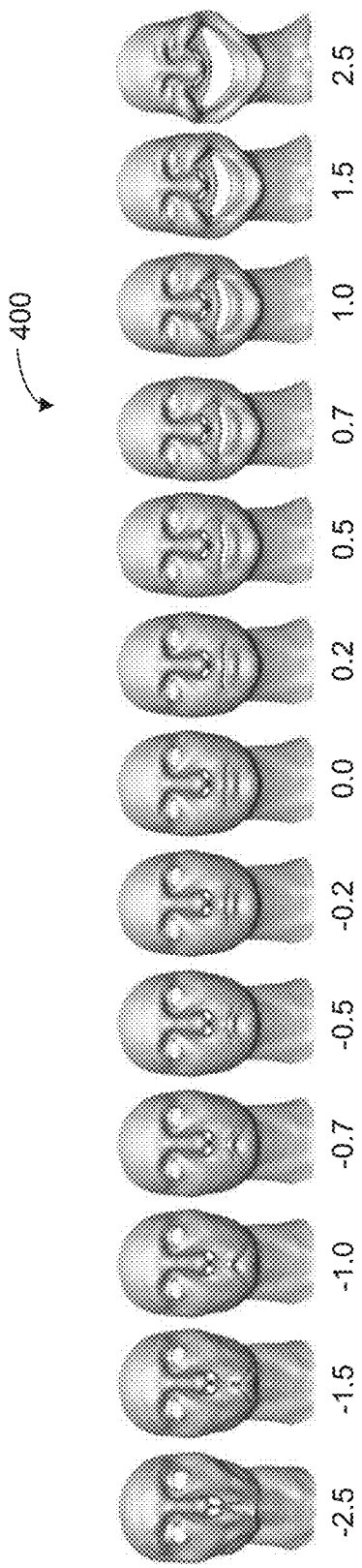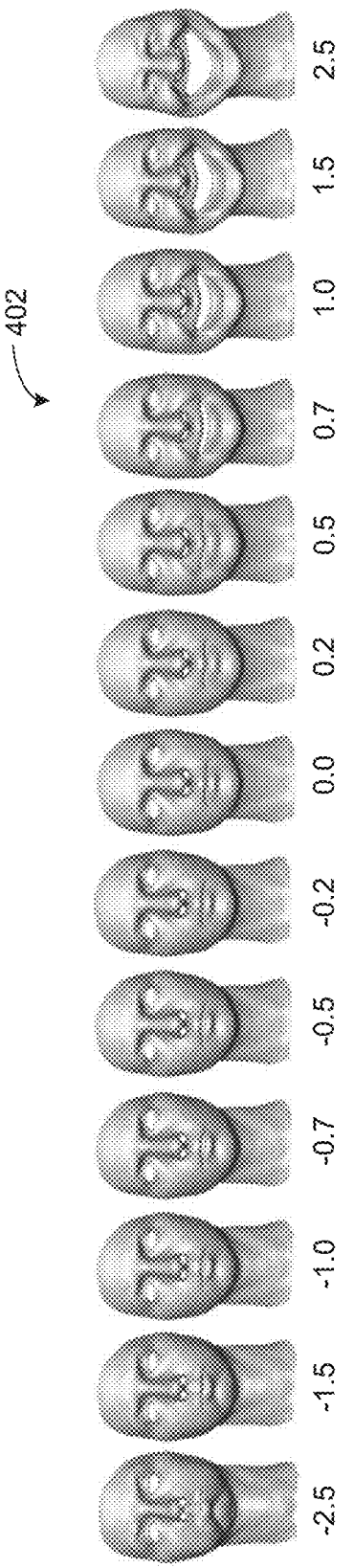
FIG. 4A (Prior Art)
FIG. 4B

SEMANTIC DEEP FACE MODELS

BACKGROUND

Technical Field

Embodiments of the present disclosure relate generally to computer vision and computer graphics and, more specifically, to semantic deep face models.

Description of the Related Art

Multi-linear morphable models that are built from three-dimensional (3D) face databases are commonly used to generate virtual 3D geometry representing human faces, which are also referred to herein as "faces." Such models typically generate a tensor of different dimensions that a user is permitted to control, such as the identity and expressions of faces that are being generated. User control over the identity and expressions of faces is oftentimes referred to as having "semantic control" of those facial dimensions. One drawback of multi-linear morphable models is that these models rely on linear combinations of different dataset shapes to generate faces, which can limit the quality and expressiveness of the generated faces. For example, the linear blending of facial shapes can result in an unrealistic-looking facial expression or unwanted artifacts, because human faces are highly nonlinear in their deformations.

Non-linear face models, including those based on deep neural networks, have been used to generate more realistic-looking facial images. However, typical non-linear face models do not produce 3D geometry and do not have any notion of semantic control. In particular, such models cannot be used to generate faces having user-controllable identities and expressions.

Currently, there are few, if any, techniques that can generate realistic-looking faces while providing user control of facial identities and expressions.

As the foregoing illustrates, what is needed in the art are more effective techniques for generating faces.

SUMMARY

One embodiment of the present application sets forth a computer-implemented method for generating a representation of a face. The method includes receiving a representation of a facial identity and a representation of a facial expression. The method further includes performing one or more decoding operations based on an encoded representation of the facial identity and an encoded representation of the facial expression to generate a representation of a face having the facial identity and the facial expression.

Another embodiment of the present application sets forth a non-transitory computer-readable storage medium including instructions that, when executed by a processing unit, cause the processing unit to perform steps for generating a representation of a face. The steps include receiving a representation of a facial identity and a representation of a facial expression. The steps further include processing an encoded representation of the facial identity and an encoded representation of the facial expression using a decoder to generate a representation of a face having the facial identity and the facial expression.

Another embodiment of the present application sets forth a computer-implemented method of training a model for generating faces. The method includes receiving a data set that includes meshes of neutral faces and meshes of faces having expressions. The method further includes training a model based on the data set. The model includes a first encoder that maps representations of neutral faces to encoded representations of facial identities, a second encoder that maps representations of facial expressions to encoded representations of the facial expressions, and a decoder that maps encoded representations of facial identities and encoded representations of facial expressions to representations of faces.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques disentangle the notions of facial identity and facial expression using separate facial identity and expression encoders. This architectural approach allows facial identities and expressions to be separately controlled by a user when generating faces using a nonlinear model that includes the facial identity and expression encoders. In addition, the disclosed techniques can be used to generate faces that are more realistic-looking than faces generated by conventional approaches that implement linear-based techniques. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A illustrates exemplar facial expressions along an expression dimension generated using a conventional linear model, according to the prior art;

FIG. 4B illustrates exemplar facial expressions along an expression dimension generated using the face model of FIG. 1, according to various embodiments;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
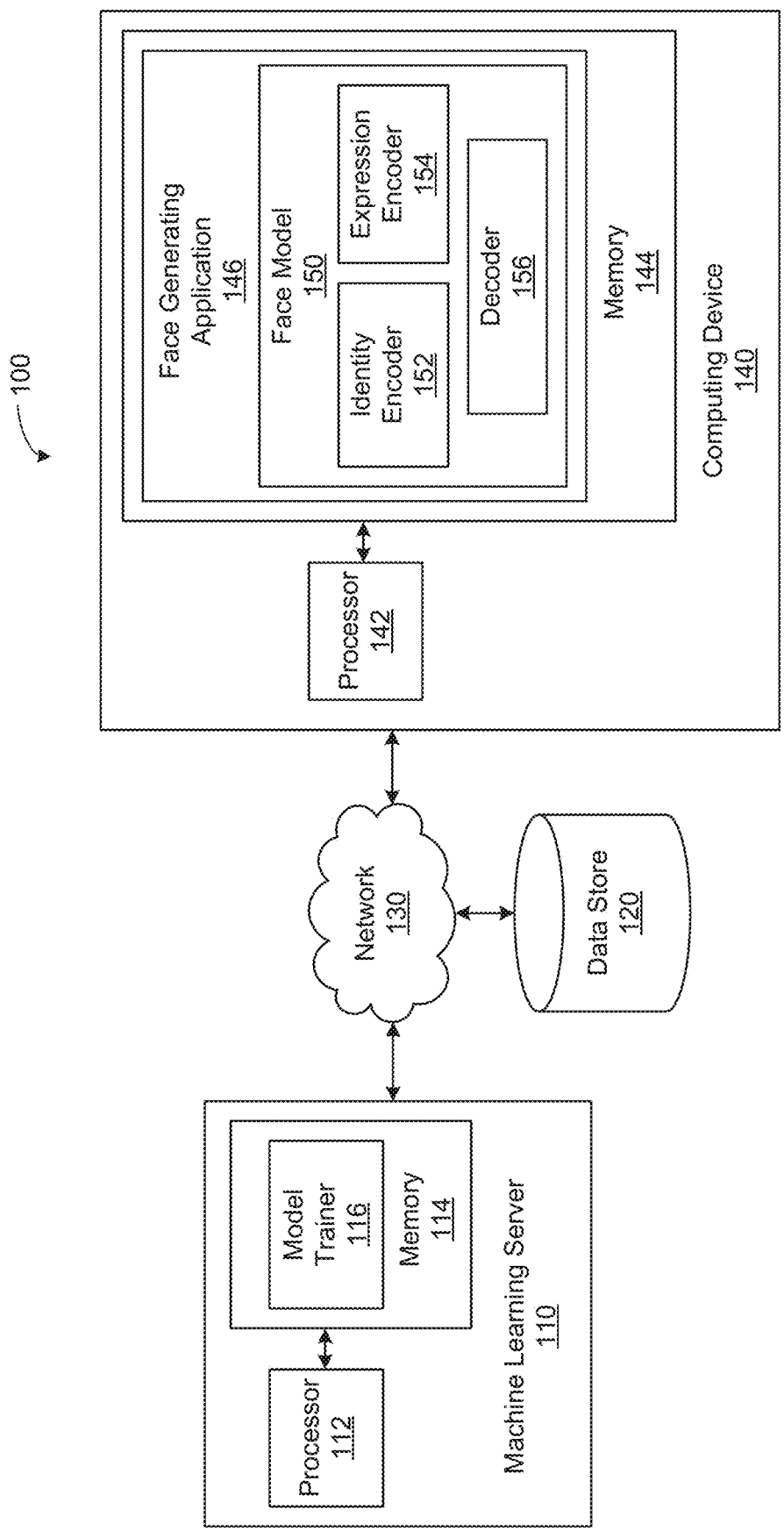
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

The model trainer 116 is configured to train machine learning models, including a non-linear model for generating faces 150, which is also referred to herein as a "face model." As shown, the face model 150 includes an identity encoder 152, an expression encoder 154, and a decoder 156. Any technically feasible types of encoders and decoders may be used. In some embodiments, each of the identity encoder 152 and the expression encoder 154 may include a deep neural network, such as an encoder from a variational autoencoder (VAE). Similarly, the decoder 156 may also include a deep neural network in some embodiments. Operation(s) performed to encode representations of facial identities using the identity encoder 152, or to encode representations of facial expressions using the expression encoder 154 (or another mapping), are also referred to herein as "encoding operation(s)." Operation(s) performed to generate a representation of a face using the decoder 156, based on an encoded representation of a facial identity and an encoded representation of a facial expression, are also referred to herein as "decoding operation(s)."

As discussed in greater detail below, the identity encoder 152 takes as input a representation of a facial identity and outputs an encoded representation of the facial identity, which is also referred to herein as an "identity code." In some embodiments, the representation of the facial identity that is input into the identity encoder is the difference between a three-dimensional (3D) mesh (e.g., a triangle mesh) of a particular face with a neutral expression and a reference mesh. As used herein, a "neutral" expression refers to a facial expression with neutral positioning of facial features, which is in contrast to other expressions that show stronger emotions such as smiling, crying, etc. The reference mesh can be an average of multiple meshes of faces with neutral expressions, and the difference between the mesh of a particular face and the reference mesh can include displacements between vertices of the two meshes. In some embodiments in which the identity encoder 152 includes a VAE encoder, an identity code can be obtained by compressing such displacements into a mean and a standard deviation using the VAE encoder. Thereafter, a normal distribution can be sampled based on the mean and standard deviation using a re-parameterization technique, and the sampled result can be used as the identity code. In some embodiments, the re-parameterization is performed during training to make the network differentiable, but subsequent to training when the identity encoder 152 is deployed, the re-parameterization may (or may not) be omitted, as experience has shown that similar results are produced regardless of whether re-parameterization is performed. In such cases, the identity encoder 152 may be considered to include the re-parameterization that is used during training, even if re-parameterization is not performed thereafter.

In parallel to the identity encoder 152, the expression encoder 154 takes as input a representation of a facial expression and outputs an encoded representation of the facial expression, which is also referred to herein as an "expression code." In other embodiments, operations of the identity encoder 152 and the expression encoder 154 may not all be performed in parallel. In some embodiments, the facial expression may be represented as blendweight values, such as a blendweight vector, corresponding to a target expression. Blendweight values, also referred herein as "blendweights," specify how different shapes, such as a shape of a smiling face and a shape of a crying face, should be blended together. For example, a user could specify the blendweight corresponding to a desired facial expression (i.e., the target expression) by adjusting sliders for the blendweights on a user interface (UI). Although discussed herein primarily with respect to blendweights, facial expressions can be represented using other types of control structures for animating faces, which are commonly referred to as "rigs," in alternative embodiments. Similar to the identity encoder 152, in some embodiments, the expression encoder 154 includes a VAE that outputs a mean and a standard deviation that are used to sample from a normal distribution using a re-parameterization technique, in order to determine an expression code, although the re-parameterization may (or may not) be omitted after the expression encoder 154 is trained and deployed.

As described, the identity encoder 152 in the face model 150 only sees the geometry of a neutral mesh (minus a reference mesh) that represents a facial identity, without knowing about any facial expressions. On the other hand, the expression encoder 154 only sees blendweights that represent a facial expression, without having any notion of facial identity. A joint decoder 156 fuses information relating to a facial identity that is output by the identity encoder 152 together with information relating to a facial expression that is output by the expression encoder 154, producing geometry having the facial identity as well as the facial expression. Specifically, the identity and expression codes generated by the identity encoder 152 and the expression encoder 154, respectively, can be concatenated together and input into the decoder 156, which outputs a representation of a face having a facial identity and expression corresponding to the input identity and expression codes. In some embodiments, the representation of the face that is output by the decoder 156 includes vertex displacements for deforming the reference mesh into the face having the facial identity and expression.

Example architectures of the identity encoder 152, the expression encoder 154, and the decoder 156, as well as techniques for training the same, are discussed in greater detail below. In some embodiments, the identity encoder 152, the expression encoder 154, and the decoder 156 are trained by the model trainer 116 in an end-to-end and fully supervised manner, discussed below in conjunction with FIG. 10. In such cases, the training data set may include 3D meshes of neutral faces for different facial identities, as well as meshes for the same facial identities and a number of predefined expressions. All of the meshes have vertex correspondence with each other, i.e., the same mesh topology is used to fit all of the facial identities and expressions in the data set. Such meshes may be obtained from standalone images and/or the image frames of a video. To train the face model 150, the model trainer 116 solves for blendweights based on the meshes of faces with expressions (or obtains the blendweights from elsewhere), and the model trainer 116 then trains the identity encoder 152, the expression encoder 154, and the decoder 156 using the neutral face meshes minus a reference mesh, as well as the blendweights, as inputs into the identity encoder 152 and the expression encoder 154, respectively, and vertex displacements for corresponding meshes of faces with expressions as expected outputs of the decoder 156.

Training data and/or trained machine learning models, including the face model 150, may be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

In some embodiments, the model trainer 116 may also train a mapping between two-dimensional (2D) facial landmarks and expression codes. As discussed in greater detail below in conjunction with FIG. 8, such a mapping may be included in a model that also includes the previously trained identity encoder 152 and decoder 156. In such cases, the mapping replaces the expression encoder 154, permitting expression codes to be generated based on 2D facial landmarks determined from captured images of human faces, rather than blendweights. A model in which the expression encoder 154 is replaced by the mapping between 2D facial landmarks and expression codes is also referred to herein as a "landmark model."

The trained face model 150 and/or the landmark model may be deployed to any suitable applications that generate faces and use the same. Illustratively, a face generating application 146 is stored in a memory 144, and executes on a processor 142 of the computing device 140. Components of the computing device 140, including the memory 144 and the processor 142 may be similar to corresponding components of the machine learning server 110.

As shown, the application 146 includes the face model 150, which itself includes the identity encoder 152, the expression encoder 154, and the decoder 156. In other embodiments, the application 146 may include a landmark model in addition to, or in lieu of, the face model 150. The face model 150 and/or the landmark model may be employed in any technically feasible use cases, including face fitting (e.g., fitting to a facial identity while constraining to the neutral expression, or fitting to a facial expression once a facial identity is known), performance animation (e.g., modifying only the expression space of the face model 150), and performance transfer or retargeting (e.g., modifying only the identity space of the face model 150). For example, the application 146 could use the decoder 156 to generate novel faces by sampling from identities represented by meshes in the data set that is used to train the face model 150, which are also referred to herein as "known identities," or adding random noise to an identity code associated with a known identity. As another example, the application 146 could receive a new identity that is not one of the known identities and use the face model 150 to generate a face having the new identity and a target expression. As another example, the application 146 could perform blendweight retargeting in which the face model 150 is used to transfer facial expression(s) from an image or video to a new facial identity by determining blendweights associated with the facial expression(s) in the image or video, inputting the blendweights into the expression encoder 154, and inputting a representation of the new facial identity into the identity encoder 152. As a further example, the application 146 could perform 2D landmark-based capture and retargeting by determining 2D facial landmarks from a facial performance in a video, mapping the facial landmarks to expression codes that are then input, along with an identity code associated with a new identity, into the decoder 156 to generate faces having the new identity and the expressions in the facial performance. As used herein, a "facial performance" refers to a series of facial expressions, such as the facial expressions in successive frames of a video.

The number of machine learning servers and application servers may be modified as desired. Further, the functionality included in any of the applications may be divided across any number of applications or other software that are stored and execute via any number of devices that are located in any number of physical locations.

Non-Linear Face Models

Figure 2:
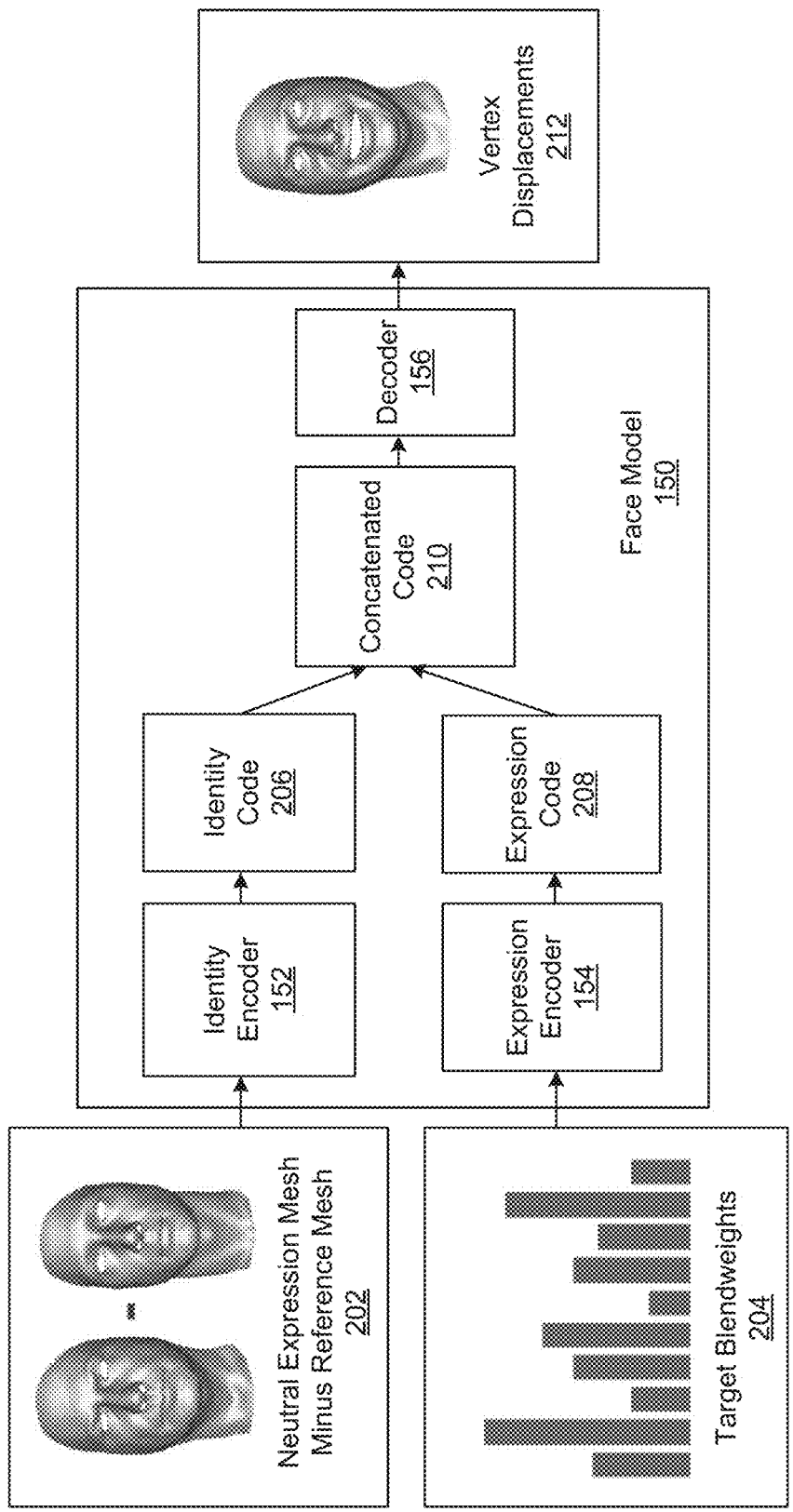
FIG. 2 is a more detailed illustration of the face model of FIG. 1, according to various embodiments.

FIG. 2 is a more detailed illustration of the non-linear face model 150 of FIG. 1, according to various embodiments. As described, the face model 150 includes the identity encoder 152, the expression encoder 154, and the decoder 156. Identity and expression are disentangled through the separate identity and expression encoders 152 and 154, which may include VAE encoders in some embodiments. In particular, this model architecture disentangles the nonlinear variational latent space of facial identities, which is the face model's 150 internal representation of facial identities, from the nonlinear variational latent space of facial expressions, which is the face model's 150 internal representation of facial expressions. Doing so enables semantic control of facial identities and expressions. In addition, the non-linear nature of the model architecture permits more realistic-looking faces to be generated than conventional multi-linear face models.

As shown, the identity encoder 152 takes as input a neutral expression mesh minus a reference mesh 202, which represents a facial identity. Given such an input, the identity encoder 152 outputs an identity code 206. As described, the reference mesh 202 can be a mean of all meshes having a neutral expression in a training data set, the neutral expression mesh and the reference mesh share the same set of vertices, and subtracting the reference mesh from the neutral expression mesh can produce per-vertex displacements associated with the neutral expression mesh.

In some embodiments, the identity encoder 152 includes a VAE encoder in the form of a fully-connected network with residual blocks that compress input displacements into a mean and standard deviation:

$$\mu_{id}, \sigma_{id} \leftarrow E_{id}(d_{id}^N), \quad (1)$$

where $d_{id}^N$ is the mean-subtracted neutral displacements that are fed as input into the VAE encoder, which is denoted by $E_{id}$; $\mu_{id}$ and $\sigma_{id}$ are the mean and standard deviation, respectively, output by the VAE encoder; the subscript id is used for the facial identity; and the superscript N corresponds to the neutral expression shape.

In parallel to the identity encoder 152, the expression encoder 154 takes a vector of blendweights 204 that corresponds to a target expression as input and compresses or expands the vector of target blendweights 204 into a variational latent space of $n_{exp}$ dimensions, outputting a facial expression code 208. Similar to the identity encoder 152, in some embodiments the expression encoder 154 includes a VAE encoder in the form of a fully-connected network with residual blocks and leaky ReLU activations. Such a VAE outputs a mean and standard deviation vector that can be fused into the expression code $z_{exp}$ using a re-parameterization technique that samples a normal distribution based on the mean and standard deviation:

$$\mu_{exp}, \sigma_{exp} \leftarrow E_{exp}(b^T) \quad (3)$$

$$z_{exp} \leftarrow \mathcal{N}(\mu_{exp}, \sigma_{exp}), \quad (4)$$

where the subscript exp is used for facial expression components, the subscript T refers to a target expression shape, $b^T$ is a blendweight vector that corresponds to a target expression shape T that is input into the VAE encoder, which is denoted by $E_{exp}$, and $\mu_{exp}$ and $\sigma_{exp}$ are the mean and standard deviation, respectively, output by the VAE encoder. As described, in some embodiment, the re-parameterization may be performed during training and omitted (or not) thereafter. Blendweights are used to condition the decoder for two reasons. First, blendweights provide a semantic point of entry into the network and can be manipulated by a user. Second, blendweights are a meaningful representation that can be used to disentangle the notions of facial identity and facial expression, as blendweights contain no notion of identity and are purely descriptive of expression.

As shown, the facial identity code 206 and the facial expression code 208 are concatenated together into a concatenated code 210 that is fed to the decoder 156. The concatenated code 210 can be in the form of a vector having dimension $n_{id}+n_{exp}$. The decoder 156 is trained to reconstruct a given identity in a desired expression. In some embodiments, the decoder 156 is a fully connected network that outputs vertex displacements $d^T$ with respect to the reference mesh:

$$d^T \leftarrow D(z_{id}, z_{exp}). \quad (5)$$

Once again, the subscript exp is used for facial expression components, and the subscript T corresponds to a target expression shape. It should be understood that the vertex displacements of equation (5) may be used to deform the reference mesh to generate a mesh having the given identity and desired expression, which can further be rendered to one or more images, such as a standalone image or the frames of a video.

In some embodiments, each of the identity and expression encoders 152 and 154 includes four residual layers. The dimensions of the residual layers of the identity and the expression encoders 152 and 154 are fixed to the dimension of the identity code $n_{id}$ and the dimension of the expression code $n_{exp}$, respectively. For example, the dimensions of the identity code and the expression code could be set to $n_{id}=32$ and $n_{exp}=256$, respectively.

As described, facial identity and expression are separated in the internal representation of the face model 150, which permits semantic control of identities and expressions of faces generated by the face model 150. Experience has shown that the face model 150 is capable of learning to generate more realistic-looking faces than conventional linear-based models. As discussed in greater detail below in conjunction with FIG. 10, in some embodiments the identity encoder 152, the expression encoder 154, and the decoder 156 are trained in an end-to-end and fully supervised manner using a L1 loss function, with the identity and expression latent spaces being constrained using Kullback-Leibler (KL) divergence losses, a fixed learning rate, and the Adaptive Moment Estimation (ADAM) optimizer. That is, three loss functions are used, the L1 loss on reconstruction, which is the mesh prediction output by the decoder 156, and two KL divergence losses on the identity and expression encoders 152 and 154, respectively.

Figure 3A:
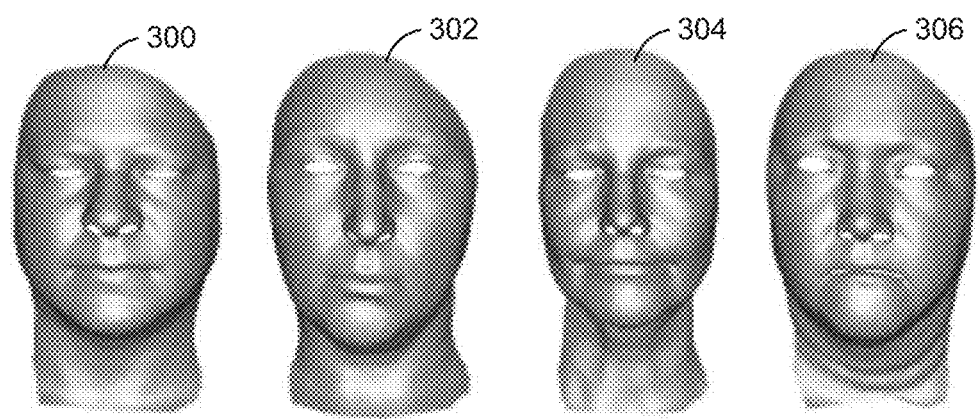
FIG. 3A illustrates exemplar identities generated using the face model of FIG. 1, according to various embodiments.

FIG. 3A illustrates exemplar facial identities 300, 302, 304, and 306 generated using the face model 150 of FIG. 1, according to various embodiments. As shown, the facial identities 300, 302, 304, and 306 have a neutral facial expression and are different from the facial identities used to train the identity encoder 152, i.e., the "known identities." In embodiments, the known identities may include any suitable identities and be represented in any technically feasible form. In the illustrated example, the facial identities 300, 302, 304, and 306 were generated by randomly sampling the identity latent space.

To generate new facial identities such as the facial identities 300, 302, 304, and 306, the application 146 can generate an identity code that represents a combination of known identities. For example, assume a user wishes to generate a new facial identity that is similar to one of the known identities. In such a case, the application 146 could generate an identity code for the new facial identity by adding random noise to an identity code associated with the known identity. As another example, a user could manually input an identity code associated with a desired facial identity. In other embodiments, the application 146 may generate the identity code in any technically feasible manner, such as based on user input received via a UI. Then, the application 146 can input a concatenated code that includes the identity code and an expression code into the decoder 156 to determine vertex displacements that will deform a reference mesh into a mesh of a face having the new facial identity and the expression.

Figure 3B:
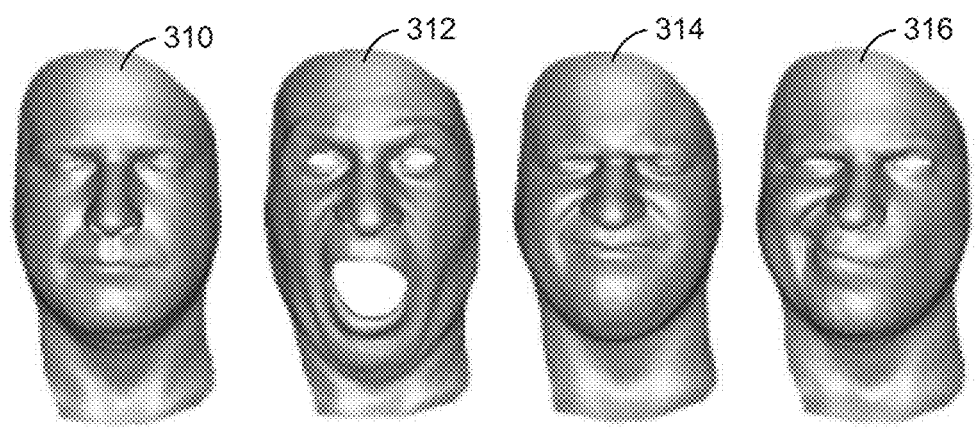
FIG. 3B illustrates exemplar facial expressions generated for the facial identity of FIG. 3A using the face model of FIG. 1, according to various embodiments.

FIG. 3B illustrates exemplar facial expressions 310, 312, 314, and 316 generated for the identity of FIG. 3A using the face model 150 of FIG. 1, according to various embodiments. As shown, the facial expressions 310, 312, 314, and 316, which represent an eyes closed expression, a mouth open expression, a grimacing expression, and a mouth left expression, respectively, are different from the expressions used to train the expression encoder 154, which are also referred to herein as "known expressions." In embodiments, the known expressions may include any suitable expressions and be represented in any technically feasible form. In the illustrated example, the facial expressions 310, 312, 314, and 316 were generated by randomly sampling the expression latent space.

To generate new facial expressions such as the expressions 310, 312, 314, and 316, the expression encoder 154 can be used to generate an expression code that represents a combination of known expressions. For example, the application 146 may provide a UI that includes sliders for selecting blendweights that indicate the intensity of shapes representing the known expressions to be included in the new facial expression. In such a case, the application 146 could generate an expression code for the new facial expression by processing the blendweights using the expression encoder 154. Then, the application 146 can input a concatenated code that includes the identity code and the expression code into the decoder 156 to determine vertex displacements that will deform a reference mesh into a mesh of a face having the facial identity and the new facial expression.

FIG. 4A illustrates exemplar facial expressions along an expression dimension generated using a conventional linear model, according to the prior art. Illustratively, a blendweight associated with a smile expression shape has been varied between −2.5 and 2.5 to generate a set of facial expressions 400 using a linear blendshape model. As shown, the linear blendshape model can produce exaggerated and physically infeasible expressions. This is particularly the case outside the range of blendweight values [−1, 1].

FIG. 4B illustrates exemplar facial expressions 402 along an expression dimension generated using the face model 150 of FIG. 1, according to various embodiments. As shown, the blendweight associated with a smile expression shape has been varied between −2.5 and 2.5 to generate a set of facial expressions 402 using the face model 150. As described, blendweights associated with a desired expression may be input into the expression encoder 154 to generate an expression code, which can then be input into the decoder 156 along with an identity code to determine vertex displacements for deforming a reference mesh into a mesh of a face having the facial identity and expression.

Experience has shown that linearly varying a blendshape blendweight within [0, 1] provides a nonlinear effect on the generated shape. As shown in FIG. 4B, a generated smile starts off as a closed mouth smile up until 0.6, and then opens up, which appears more natural than the monotonous interpolation generated by the conventional linear blendshape model, shown in FIG. 4A.

Figure 5A:
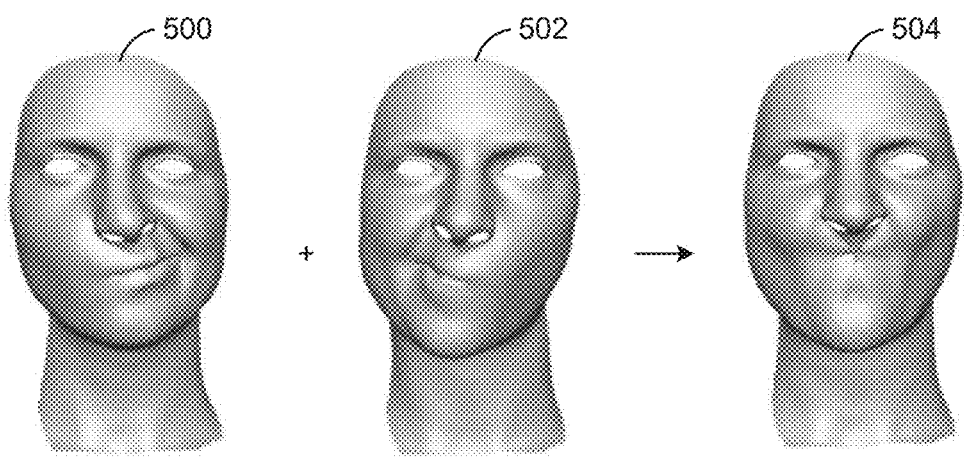
FIG. 5A illustrates an exemplar superimposing of facial expressions generated using a linear blending technique, according to the prior art.

FIG. 5A illustrates an exemplar superimposing of facial expressions generated using a linear blending technique, according to the prior art. Experience has shown that conventional linear-based models can be used to superimpose expressions that are non-conflicting (ideally orthogonal), but such models produce poor results for many other shape combinations. As shown, an unrealistic-looking facial expression 504 is produced by superimposing a mouth-right expression 500 and a mouth-left expression 502 using a linear-based model.

Figure 5B:
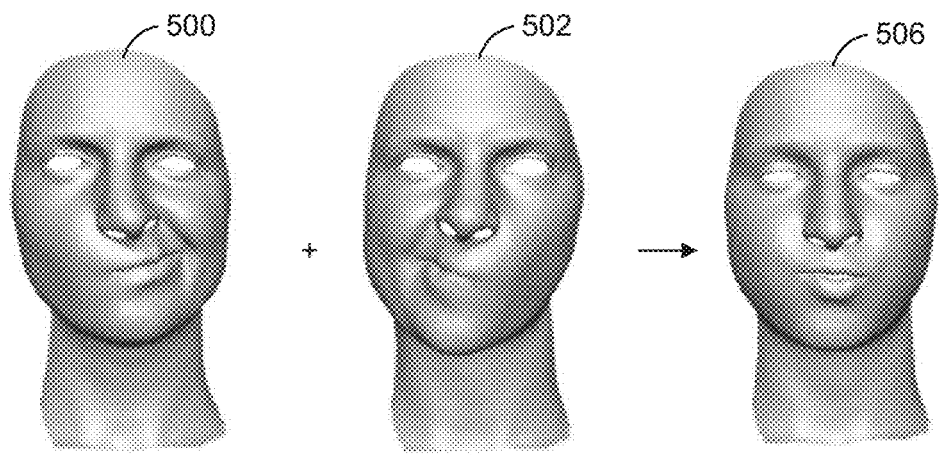
FIG. 5B illustrates an exemplar superimposing of facial expressions generated using the face model of FIG. 1, according to various embodiments.

FIG. 5B illustrates superimposing the mouth-right expression 500 and the mouth-left expression 502 using the face model 150 of FIG. 1, according to various embodiments described herein. As shown, a facial expression 506 generated by the face model 150 appears more realistic-looking than the facial expression 504 generated by the conventional linear-based model that is described above in conjunction with FIG. 5A.

Figure 6:
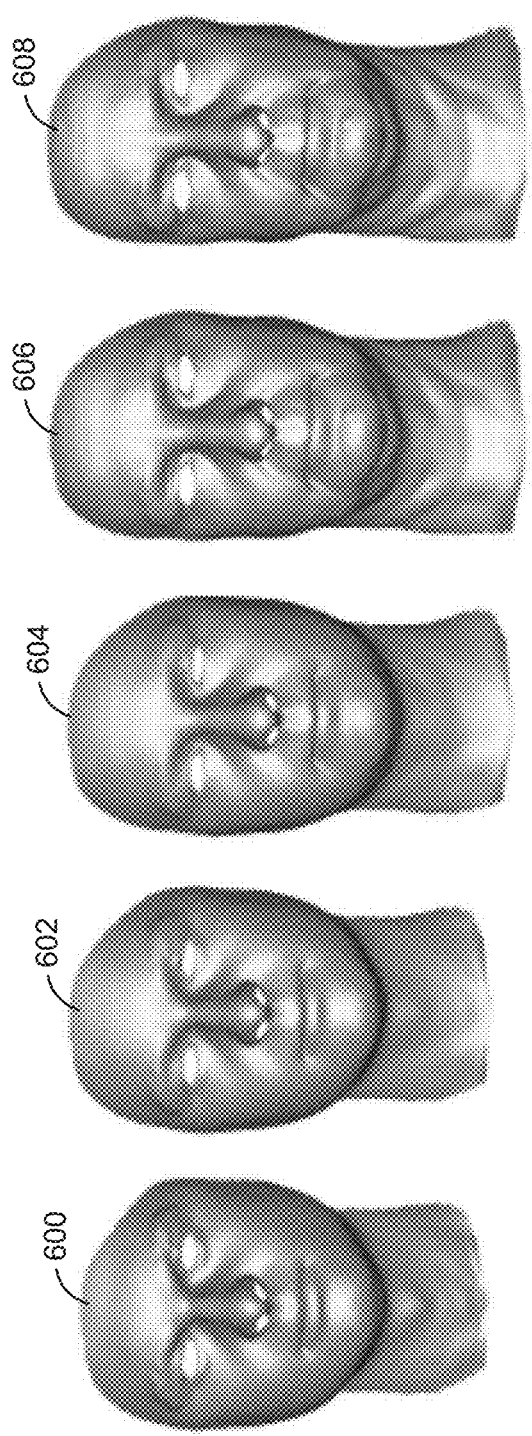
FIG. 6 illustrates an exemplar interpolation between identities generated using the face model of FIG. 1, according to various embodiments.

FIG. 6 illustrates an exemplar interpolation between identities generated using the face model 150 of FIG. 1, according to various embodiments. For example, a female identity could be interpolated with a male identity to determine an appearance of their offspring. As shown, facial identities 600 and 608 have been interpolated in a 128-dimension latent identity space to generate additional facial identities 602, 604, and 606 that are between the facial identities 600 and 608. Illustratively the interpolation produces a smooth and non-linear traversal of geometry that takes the facial identity 600 to the facial identity 608.

Experience has shown that interpolated facial identities generated using the non-linear face model 150 appear more realistic-looking, and include fewer artifacts such as intersecting geometry, than interpolated identities generated using conventional linear-based models. Realistic-looking faces can be generated because the face model 150 interpolates in a latent code space to generate valid faces, rather than simply (linearly) interpolating the vertices of faces. The degree of nonlinearity reflected in the output shapes varies as a function of the dimensionality of the identity latent space, with a lower dimensionality producing higher nonlinearity. As a result, interpolating between two identities will appear to pass through other identities for lower-dimensional identity latent spaces. On the other hand, a lower-dimensional identity latent space may reduce reconstruction accuracy due to higher compression. However, the representational power of the face model 150 can be significantly higher than linear models, especially at lower dimensions.

Figure 7:
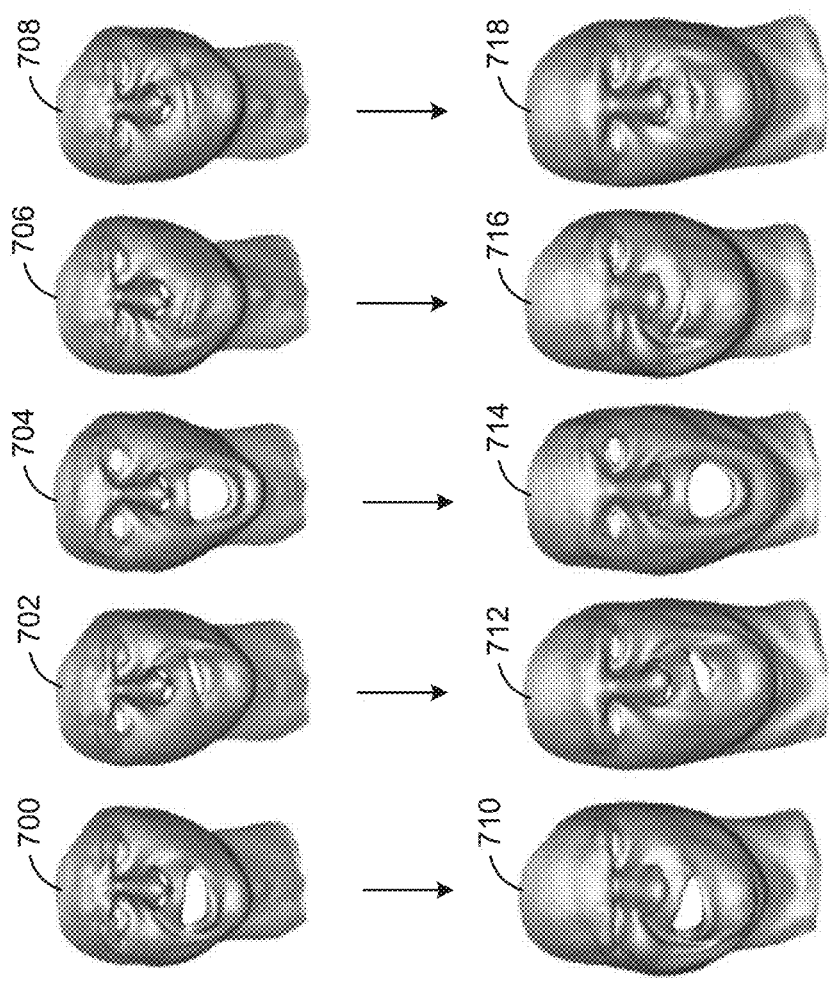
FIG. 7 illustrates an exemplar retargeting of a facial performance from one facial identity to another facial identity using the face model of FIG. 1, according to various embodiments.

FIG. 7 illustrates an exemplar retargeting of a facial performance from one facial identity to another facial identity using the face model 150 of FIG. 1, according to various embodiments. As shown, facial expressions 700, 702, 704, 706, and 708 that are associated with one facial identity are retargeted to the same facial expressions 710, 712, 714, 716, and 718 for a new facial identity in a natural-looking, nonlinear manner. As used herein, "retargeting" refers to transferring the facial expressions associated with one facial identity, which may be represented as blendweights, onto another facial identity. In some embodiments, retargeting is performed by inputting an identity code associated with the new identity and expression codes associated with the facial expressions 700, 702, 704, 706, and 708 into the decoder 156 to generate vertex displacements for deforming a reference mesh into meshes of faces having the new facial identity and the same expressions 710, 712, 714, 716, and 718. As described, the identity code for the new identity may be manually entered by a user, generated by adding random noise to the identity code associated with a known identity, generated by inputting a neutral face mesh associated with the new identity minus the reference mesh into the identity encoder 152, or in any other technically feasible manner. As described, the expression code may also be manually entered by a user, generated by inputting user-specified or automatically-determined blendweights into the expression encoder 154, or in any other technically feasible manner.

Figure 8:
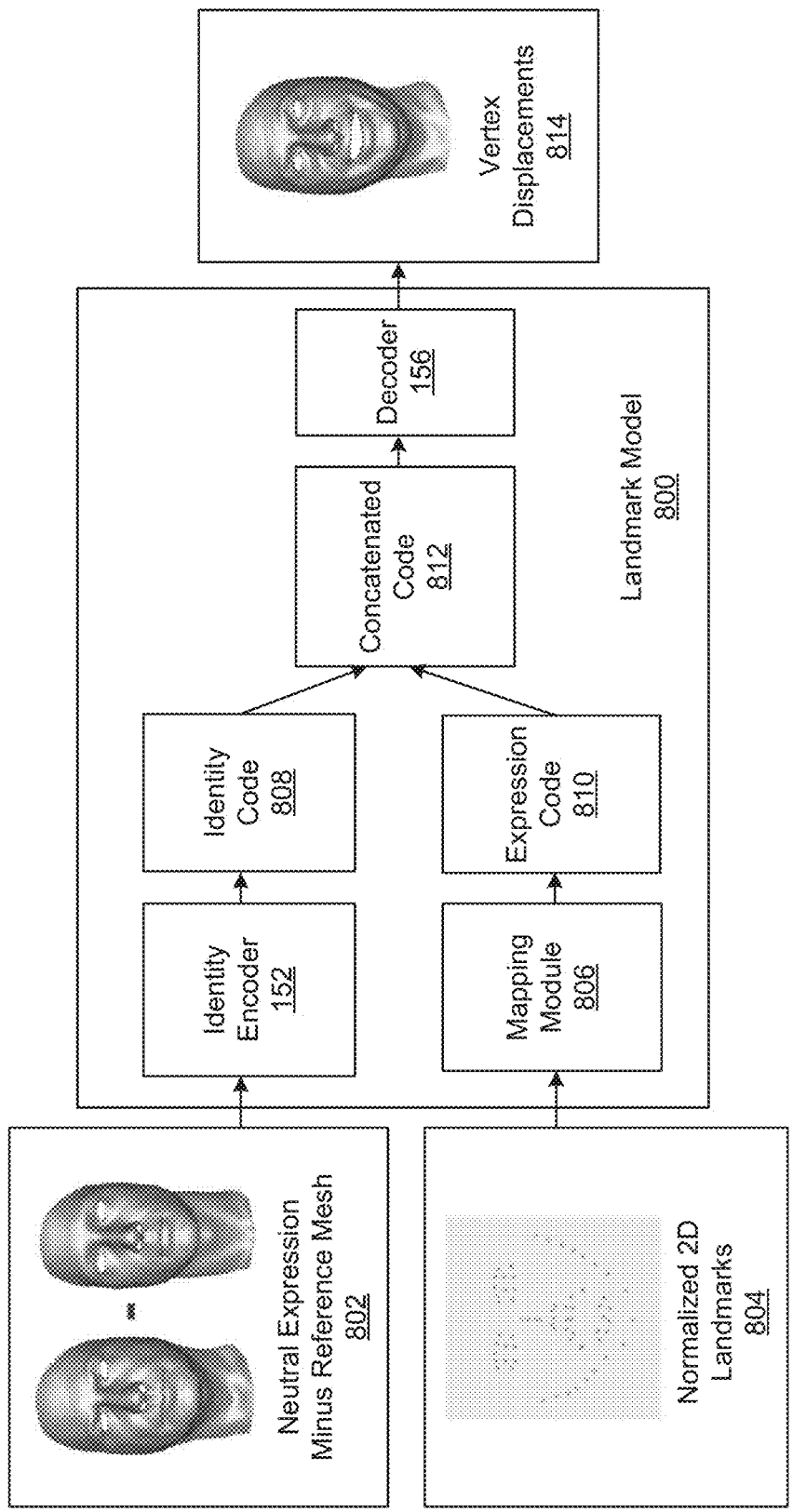
FIG. 8 illustrates a landmark model that includes a mapping between two-dimensional (2D) facial landmarks and expression codes, according to various embodiments.

FIG. 8 illustrates a landmark model 800 that includes a mapping between 2D facial landmarks and expression codes, according to various embodiments. As shown, the landmark model 800 includes the same identity encoder 152 and decoder 156 as the face model 150. However, the landmark model 800 includes a mapping module 806 that maps between 2D facial landmarks and expression codes, rather than the expression encoder 154. The mapping module 806 permits expression codes to be generated from 2D facial landmarks detected in images, such as standalone images or the frames of a video. Such 2D facial landmarks may be detected in any technically feasible manner, including using well-known landmark detection techniques. It should be understood that detecting 2D facial landmarks is typically easier than solving for blendweights.

In some embodiments, sets of 2D facial landmarks could be detected in the captured facial performance of an individual in frames of a video, and the sets of landmarks can then be input into the mapping module 806 to generate expression codes, such as the expression code 810. In such cases, the application 146 can also normalize the sets of 2D landmarks to generate normalized landmarks, such as normalized 2D landmarks 804, in order to factor out image translation and scale. In such cases, the application 146 may translate the set of landmarks corresponding to an image such that one of the landmarks is at a predefined position, as well as rescale the set of landmarks such that the length between at least two of the landmarks is a predefined value. For example, the application 146 could translate the set of landmarks such that a landmark corresponding to the center of a nose is at (0,0) and rescale the set of landmarks such that the length of the nose is 1. The application 146 then processes the normalized landmarks (as, e.g., a vector in which the normalized landmarks are stacked together) using the mapping module 806 to generate the expression code 810.

In parallel to processing normalized landmarks using the mapping module 806, the application 146 may input a representation of a facial identity, which as shown is a mesh of a face having a target identity and a neutral expression minus a reference mesh 802, into the identity encoder 152 to generate an identity code 808. The application 146 can then concatenate the expression code 810 and the identity code 808 into a concatenated code, such as the concatenated code 812. Such a concatenated code is similar to the concatenated code 210 described above in conjunction with FIG. 2. The application 146 can input the concatenated code into the decoder 156 to generate representations of faces having the target identity and the expressions represented by the 2D facial landmarks. In the case of 2D facial landmarks detected in multiple frames of a video, a concatenated code for each of the multiple frames may be determined and input into the decoder 156, as discussed in greater detail below in conjunction with FIG. 9. Illustratively, the concatenated code 812 is input into the decoder 156 to generate vertex displacements 814 that can be used to deform a reference mesh, similar to the vertex displacements 212 described above in conjunction with FIG. 2.

As discussed in greater detail below in conjunction with FIG. 11, in some embodiments, the mapping between 2D facial landmarks and expression codes that is applied by the mapping module 806 is trained while keeping the pre-trained identity encoder 152 and decoder 156 fixed. In particular, the mapping may be trained with ground truth blendweights, which permit supervision on the facial expression code, given the pre-trained expression encoder 154, and the resulting geometry may be included in a loss function during training using the pre-trained decoder 156, as discussed in greater detail below in conjunction with FIG. 11.

Figure 9:
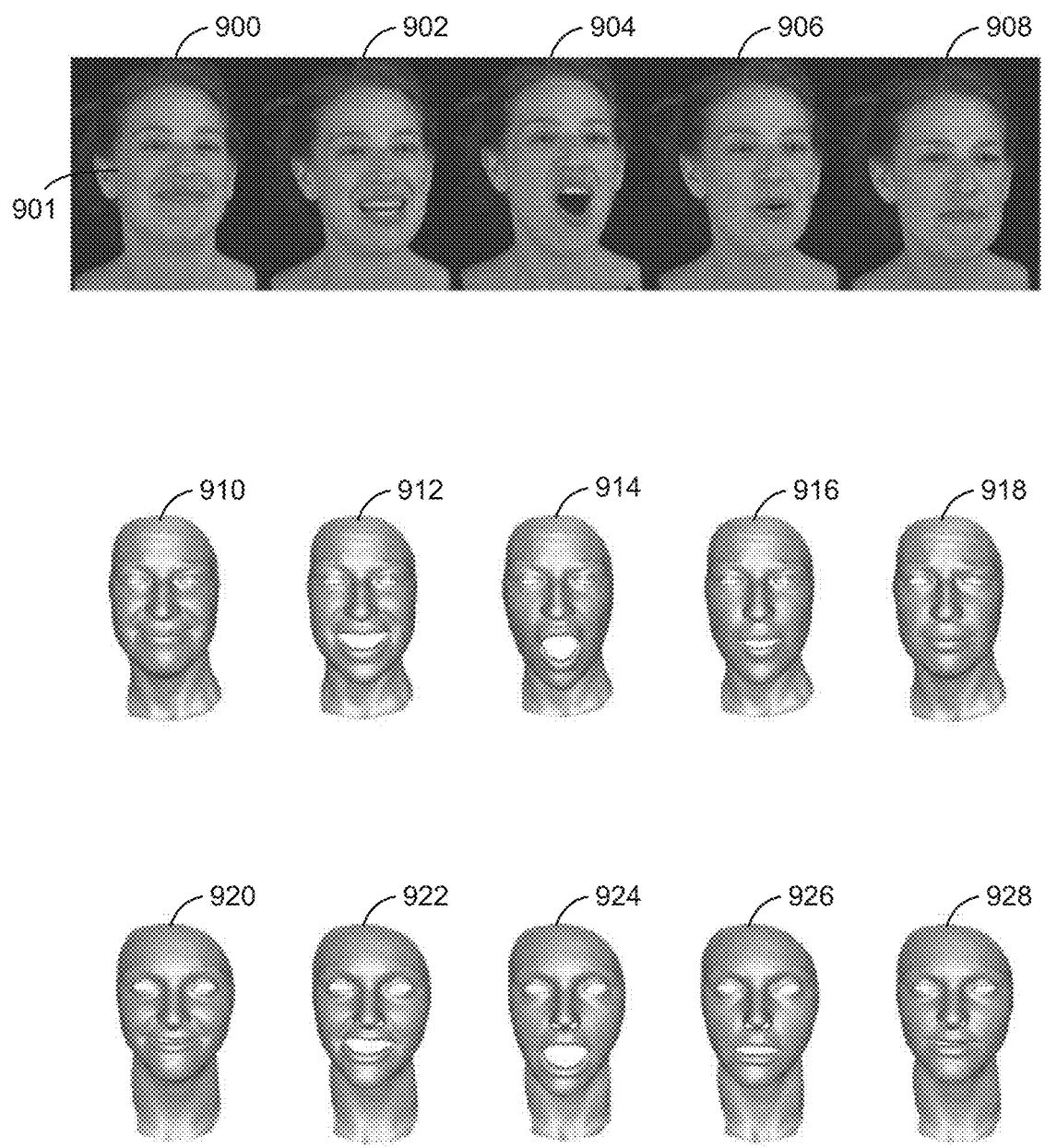
FIG. 9 illustrates an exemplar facial performance retargeting based on 2D facial landmarks detected in a video, according to various embodiments.

FIG. 9 illustrates an exemplar facial performance retargeting based on 2D facial landmarks detected in a video, according to various embodiments. As shown, a set of 2D facial landmarks 901 is detected in each of a number of frames 900, 902, 904, 906, and 908 of a video that depicts an individual performing various expressions. The 2D facial landmarks 901 are referred to herein individually as a facial landmark 901 and collectively as facial landmarks 901. As described, well-known landmark detection techniques may be used in some embodiments to detect 2D facial landmarks in images and frames of a video.

The application 146 can retarget the expressions of the individual in the video frames to meshes of faces having various identities by processing the detected sets of landmarks using the mapping module 806, which performs a mapping between 2D facial landmarks and expression codes, and further inputting a representation of a target facial identity into the identity encoder 152 that generates an associated identity code. Thereafter, the application 146 can concatenate the identity code together with the expression codes, and feed the concatenated codes into the decoder 156 to generate representations of faces having the target facial identity and the expressions depicted in the video.

As shown, faces 910, 912, 914, 916, and 918 are reconstructions of the individual in the frames 900, 902, 904, 906, and 908, respectively. In some embodiments, such reconstructions may be generated by inputting the 2D facial landmarks 901 into the mapping module 806 and inputting a mesh associated with the individual (which can be determined from images or videos using well-known techniques) into the identity encoder 152, as described above in conjunction with FIG. 8.

As shown, faces 920, 922, 924, 926, and 928 are retargetings of the expressions in the frames 900, 902, 904, 906, and 908, respectively, to a new facial identity. In some embodiments, the faces 920, 922, 924, 926, and 928 can be generated by inputting the sets of 2D facial landmarks 901 associated with each of the frames 900, 902, 904, 906, and 908 into the mapping module 806 and inputting a representation of the new facial identity into the identity encoder 152, as described above in conjunction with FIG. 8.

Figure 10:
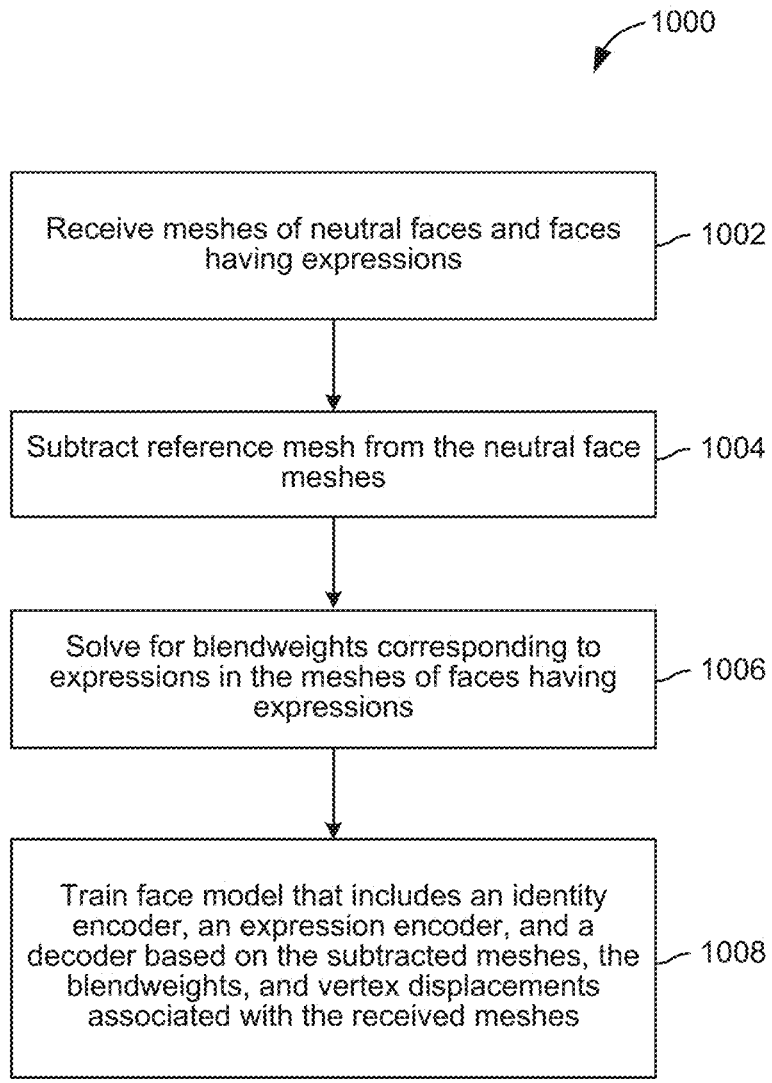
FIG. 10 sets forth a flow diagram of method steps for training a model to generate faces, according to various embodiments.

FIG. 10 sets forth a flow diagram of method steps for training a model to generate faces, according to various embodiments. Although the method steps are described in conjunction with the systems of FIG. 1-2, persons of ordinary skill in the art will understand that any system configured to perform the method steps, in any order, is within the scope of the present disclosure.

As shown, a method 1000 begins at step 1002, where the model trainer 116 receives meshes of neutral faces and meshes of faces having expressions. The meshes may be obtained in any technically feasible manner. In some embodiments, the meshes are extracted, using well-known techniques, from standalone images and/or the frames of videos depicting human faces. For example, a passively-lit, multi-camera setup could be used to capture a number of individuals having different ethnicities, genders, age groups, and body mass index (BMI) in a predefined set of facial expressions, including the neutral expression. The captured images of individuals can then be reconstructed using well-known techniques, and a template mesh including a number of vertices can be semi-automatically registered to the reconstructions of each individual. In addition, facial expressions can be stabilized to remove rigid head motions and align the facial expressions to the same canonical space. Experience has shown that a relatively small number of individuals (e.g., hundreds of individuals) and predefined expressions (e.g., tens of expressions) can be used to train the face model 150.

In addition to capturing static expressions, dynamic expressions such as sequences of the individuals speaking, may be captured in videos. That is, the face model 150 can be trained using standalone images and/or videos. In some embodiment, the video can depict an individual going through a number of facial expressions, some of which may be linear combinations of a predefined set of facial expressions. In such a case, the model trainer 116 can, using a registered mesh from a static image, perform an optimization to determine a set of blendweights associated with the combination of facial expressions in a given frame of the video. For example, the optimization could be a least squares fitting. The model trainer 116 can then use the set of blendweights during training of the face model 150, as discussed in greater detail below. It should be noted, however, that the face model 150 is trained to generate realistic-looking faces rather than blendshape fits based on the blendweights, which is what linear-based techniques would generate. That is, the face model 150 actually learns a residual between a linear blendshape model and a true nonlinear shape of 3D faces.

At step 1004, the model trainer 116 subtracts a reference mesh from each of the received neutral meshes to determine a set of differences between the meshes. As described, in some embodiments, the reference mesh is an average of the meshes of faces with neutral expressions, and the difference between neutral meshes and the reference mesh can include a set of displacements between vertices of the two meshes.

At step 1006, the model trainer 116 solves for sets of blendweights corresponding to the expressions in each of the meshes of faces having expressions. Any technically feasible technique may be used to solve for the blendweights. For example, the model trainer 116 could use the least squares fitting described above to solve for the blendweights.

At step 1008, the model trainer 116 trains the face model 150 that includes the identity encoder 152, the expression encoder 154, and the decoder 156 based on the sets of differences, the blendweights, and vertex displacements associated with the received meshes. As described, in some embodiments the identity encoder 152, the expression encoder 154, and the decoder 156 are trained end-to-end in a fully supervised manner. In such cases, reconstructed geometry is penalized using a L1 loss, and the identity and expression latent spaces are constrained using KL divergence losses. Further, a fixed learning rate and the ADAM optimizer may be used during training.

Figure 11:
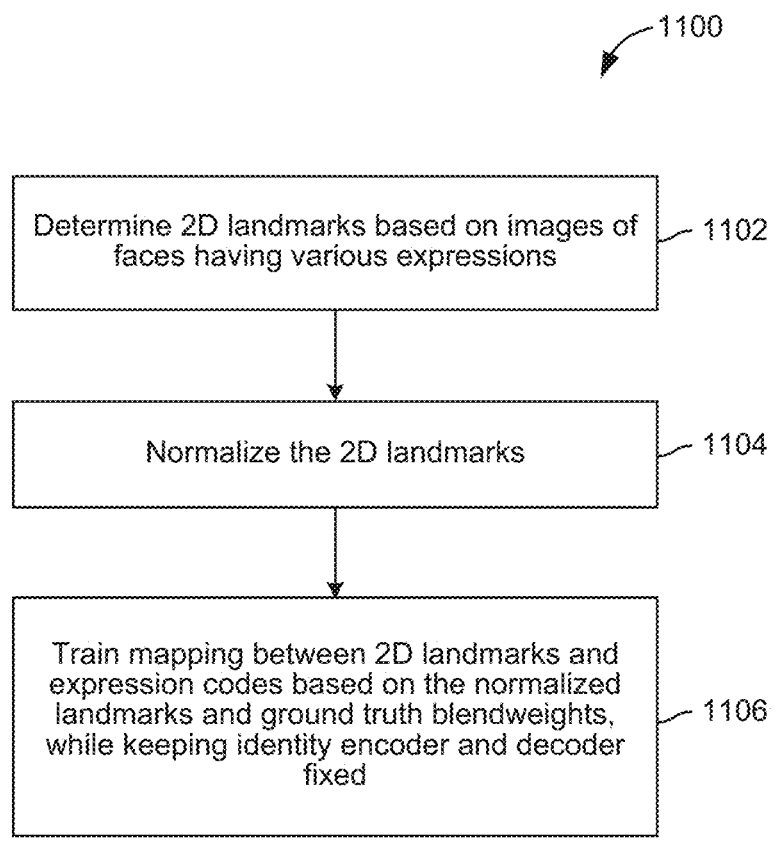
FIG. 11 sets forth a flow diagram of method steps for training a mapping between 2D facial landmarks and expression codes, according to various embodiments.

FIG. 11 sets forth a flow diagram of method steps for training a mapping between 2D facial landmarks and expression codes, according to various embodiments. Although the method steps are described in conjunction with the systems of FIGS. 1 and 8, persons of ordinary skill in the art will understand that any system configured to perform the method steps, in any order, is within the scope of the present disclosure.

As shown, a method 1100 begins at step 1102, where the model trainer 116 determines a set of 2D landmarks for each of a number of images depicting human faces with various expressions. The 2D landmarks may be determined in any technically feasible manner, including using well-known landmark detection techniques.

At step 1104, the model trainer 116 normalizes the sets of 2D landmarks. Such a normalization factors out image translation and scale. In some embodiments, the model trainer 116 may normalize the 2D landmarks by translating the landmarks such that one of the landmarks is at a predefined position and rescaling the landmarks such that the length between at least two of the landmarks is a predefined value, as described above in conjunction with FIG. 8.

At step 1106, the model trainer 116 trains the mapping between 2D landmarks and expression codes applied by the mapping module 806 based on the normalized landmarks and ground truth blendweights, while keeping the previously trained identity encoder 152 and the decoder 156 fixed. In some embodiments, the mapping may be trained using the ground truth blendweights, which permit supervision on the facial expression code, given the pre-trained expression encoder 154, and the resulting geometry may be included in the loss function during training using the pre-trained decoder 156.

Figure 12:
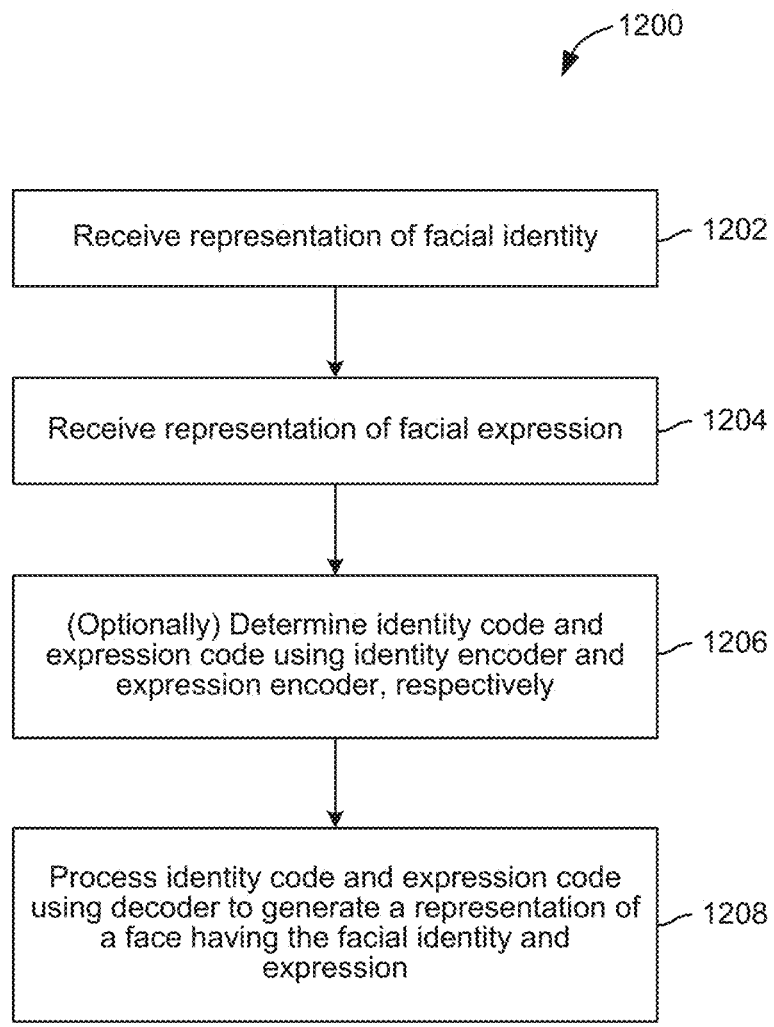
FIG. 12 sets forth a flow diagram of method steps for generating faces, according to various embodiments.

FIG. 12 sets forth a flow diagram of method steps for generating faces, according to various embodiments. Although the method steps are described in conjunction with the system of FIGS. 1-2, persons of ordinary skill in the art will understand that any system configured to perform the method steps, in any order, is within the scope of the present disclosure.

As shown, a method 1200 begins at step 1202, where the application 146 receives a representation of a facial identity. The representation of the facial identity may be in any technically feasible form. For example, the representation of the facial identity could be an identity code. As further examples, the representation of the facial identity could be a neutral face mesh that can be converted to an identity code by subtracting a reference mesh and inputting a difference into the identity encoder 152, a captured image or video frame from which such a neutral face mesh can be determined, etc.

At step 1204, the application 146 receives a representation of a facial expression. The representation of the facial expression may be in any technically feasible form. For example, the representation of the facial expression could be an expression code. In particular, a user could input a "one-hot" vector that specifies a blendweight of 1 for one blendshape and 0 for other blendshapes, or a vector that specifies blendweights for combining multiple blendshapes. As further examples, the representation of the facial expression could include target blendweights that are specified by a user (e.g., via sliders within a UI) and can be converted to an expression code using the expression encoder 154, target blendweights determined based on a frame of an animation of a face, etc.

At step 1206, the application 146 optionally determines an identity code and an expression code using the identity encoder 152 and the expression encoder 152, respectively. This step assumes that the representations of the facial identity and the facial expression received at steps 1202 and 1204 are not identity and expression codes, respectively, in which case the application 146 may simply concatenate the identity and expression codes together. When the representations of the facial identity and the facial expression are not identity and expression codes, however, the application 146 can input such representations, after any necessary processing (e.g., to subtract a reference mesh from a neutral face mesh or to solve for blendweights based on an image or video frame), into the identity encoder 152 that outputs an identity code and the expression encoder 152 that outputs an expression code, respectively. In some embodiments, the receipt of the representation of the facial identity at step 1202 and the determining of the identity code using the identity encoder 152 can occur in parallel with the receipt of the representation of the facial expression at step 1204 and the determining of the expression code using the expression encoder 152.

At step 1208, the application 146 processes the identity code and the expression code using the decoder 156 to generate a representation of a face having the facial identity and expression. In some embodiments, the representation of the face includes vertex displacements that can be used to deform a reference mesh into the face having the facial identity and expression, as described above in conjunction with FIGS. 1-2.

Thereafter, the application 146 may render one or more images using the representation of the face output by the decoder 156. For example, the application 146 could deform a reference mesh using vertex displacements output by the decoder 156, and then render the deformed mesh as a standalone image or one or more frames of a video.

Figure 13:
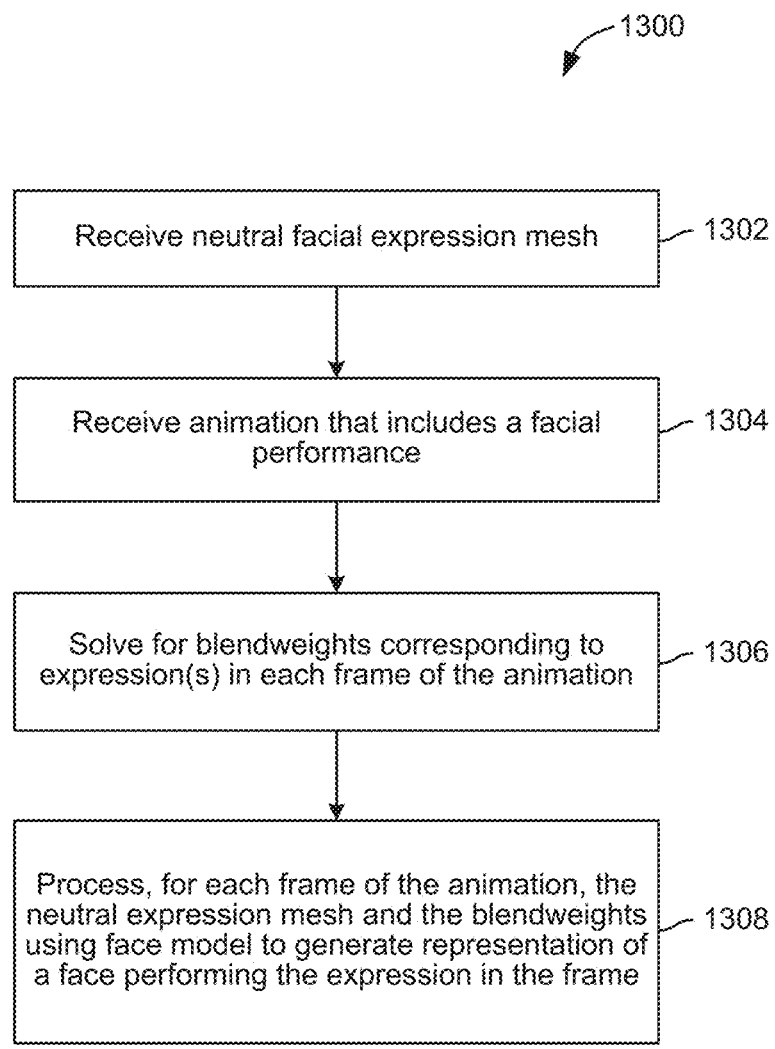
FIG. 13 sets forth a flow diagram of method steps for retargeting a facial performance on a new facial identity, according to various embodiments.

FIG. 13 sets forth a flow diagram of method steps for retargeting a facial performance on a new facial identity, according to various embodiments. Although the method steps are described in conjunction with the system of FIGS. 1-2, persons of ordinary skill in the art will understand that any system configured to perform the method steps, in any order, is within the scope of the present disclosure.

As shown, a method 1300 begins at step 1302, where the application 146 receives a neutral facial expression mesh associated with a new identity. The neutral facial expression mesh may be generated in any technically feasible manner. For example, the application 146 (or another application) could use well-known techniques to extract the neutral facial expression mesh from a captured image or video of an individual.

At step 1304, the application 146 receives an animation that includes a facial performance. In some embodiments, the receipt of the neutral facial expression mesh at step 1302 may occur concurrently with the receipt of the animation at step 1304. As described, the facial performance includes a series of facial expressions. In some embodiments, the facial performance is a 3D animation of a mesh. In other embodiments, the facial performance may be in any technical feasible form, such as a video, multiple videos taken from different vantage points, an artist-created animation, etc. Although described with respect to an animation, it should be understood that the retargeting of the method 1300 may also be performed for an individual facial expression, such as a facial expression in a standalone image.

At step 1306, the application 146 solves for blendweights corresponding to expression(s) in each frame of the animation. The application 146 may solve for the blendweights in any technically feasible manner, including using least squares fitting. In particular, solving for the blendweights may include solving to a 3D animation of a mesh, solving to a single video, solving to multiple videos, solving to an artist-created animation, etc., depending on the type of animation that is received at step 1304.

At step 1308, the application 146 processes, for each frame of the animation, the neutral expression mesh and the blendweights using the face model 150 to generate a representation of a face performing the expression indicated by the blendweights in the frame. Similar to step 1210 of the method 1200 described above in conjunction with FIG. 12, the representation of the face can, in some embodiments, include vertex displacements for deforming a reference mesh into a mesh of a face having the target facial identity and the expression in the frame.

Figure 14:
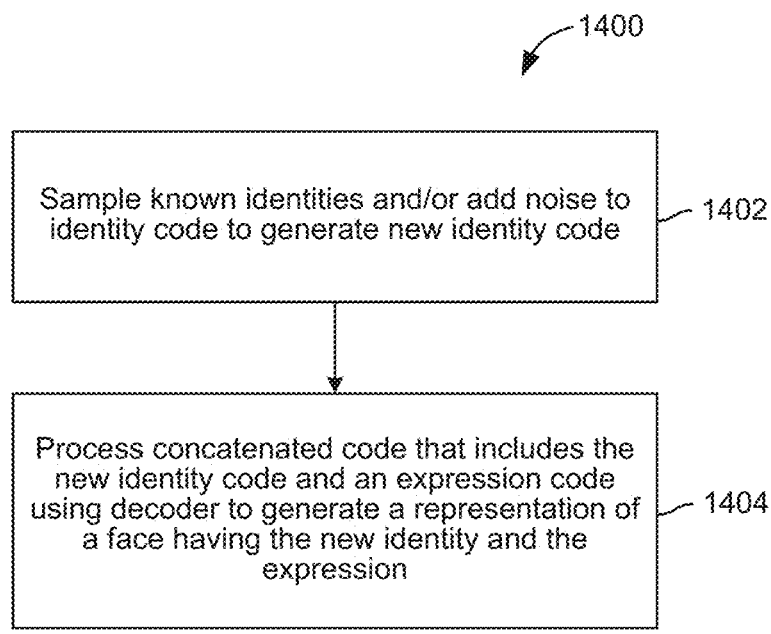
FIG. 14 sets forth a flow diagram of method steps for generating new facial identities, according to various embodiments.

FIG. 14 sets forth a flow diagram of method steps for generating new facial identities, according to various embodiments. Although the method steps are described in conjunction with the system of FIGS. 1-2, persons of ordinary skill in the art will understand that any system configured to perform the method steps, in any order, is within the scope of the present disclosure.

As shown, a method 1400 begins at step 1402, where the application 146 samples known identities and/or adds noise to an identity code to generate a new identity code. For example, the application 146 could sample the known identities by generating an identity code associated with a facial identity that is a random, or user-specified, combination of the known identities.

At step 1404, the application 146 processes a concatenated code that includes the new identity code and an expression code using the decoder 156 to generate a representation of a face having a new facial identity associated with the identity code and an expression associated with the expression code. Similar to step 1210 of the method 1200 described above in conjunction with FIG. 12, the representation of the face can, in some embodiments, include vertex displacements for deforming a reference mesh into the face having the new identity and the expression.

Figure 15:
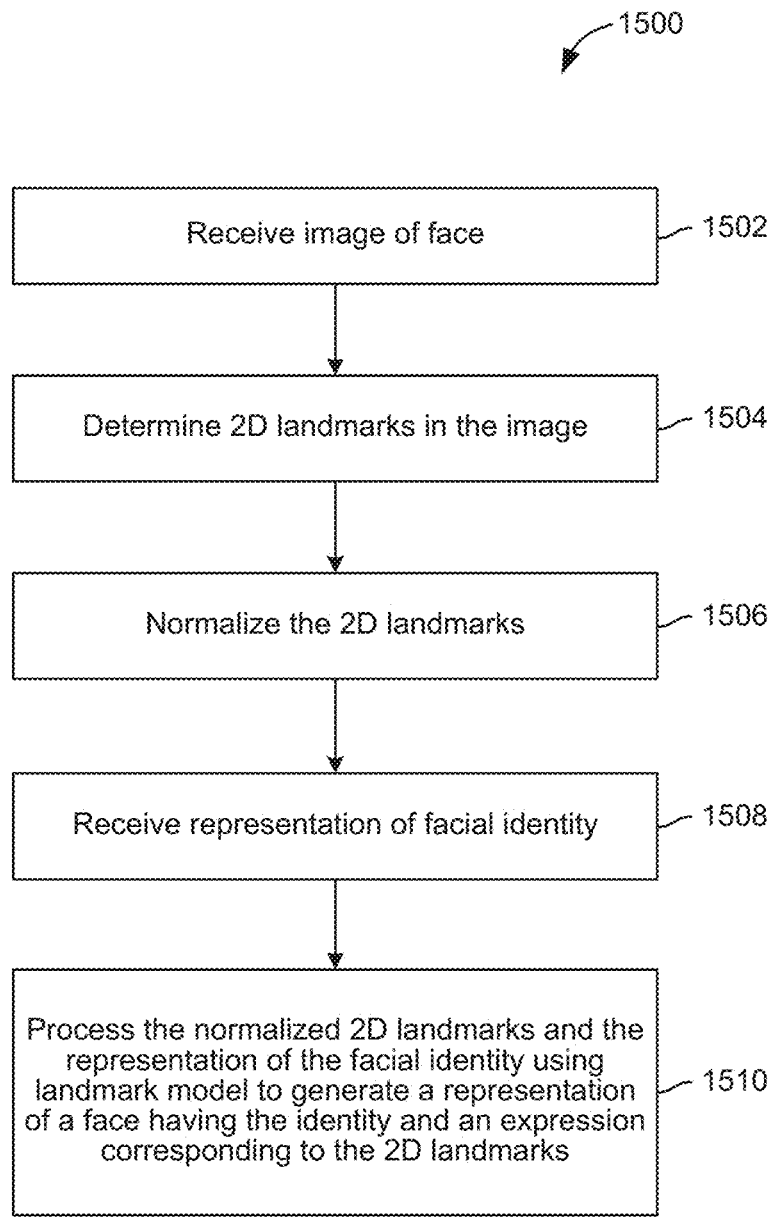
FIG. 15 sets forth a flow diagram of method steps for 2D landmark-based retargeting, according to various embodiments.

FIG. 15 sets forth a flow diagram of method steps for 2D landmark-based retargeting, according to various embodiments. Although the method steps are described in conjunction with the system of FIG. 8, persons of ordinary skill in the art will understand that any system configured to perform the method steps, in any order, is within the scope of the present disclosure.

As shown, a method 1500 begins at step 1502, where the application 146 receives an image of a face. For example, the image could be a standalone image or one of multiple frames of a video. In the case of a video, steps of the method 1500 may be repeated for each frame in the video.

At step 1504, the application 146 determines 2D landmarks in the received image. Similar to step 1102 of the method 1100 described above in conjunction with FIG. 11, the 2D landmarks may be determined in any technically feasible manner, including using well-known landmark detection techniques.

At step 1506, the application 146 normalizes the 2D landmarks. Such a normalization factors out image translation and scale. Similar to step 1104 of the method 1100 described above in conjunction with FIG. 11, normalizing the 2D landmarks may include translating the landmarks such that one of the landmarks is at a predefined position and rescaling the landmarks such that the length between at least two of the landmarks is a predefined value.

At step 1508, the application 146 receives a representation of a facial identity. Similar to step 1202 of the method 1200 described above in conjunction with FIG. 12, the facial identity may be represented in any technically feasible manner, such as an identity code, a neutral face mesh that can be converted to an identity code using the identity encoder 152, an image or video frame from which a neutral face mesh can be determined, etc.

At step 1510, the application 146 processes the normalized 2D landmarks and the representation of the facial identity using the landmark model 800 to generate a representation of a face having the identity and an expression corresponding to the normalized 2D landmarks. Similar to step 1210 of the method 1200 described above in conjunction with FIG. 12, the representation of the face can, in some embodiments, include vertex displacements for deforming a reference mesh into the face having the facial identity and an expression corresponding to the normalized 2D landmarks.

Although discussed herein primarily with respect to human faces, some embodiments may also be used to generate other types of faces, such as animal faces, or even objects other than faces. For example, embodiments could be used in general character rigging. Although discussed herein primarily with respect to the identity encoder 152 and the expression encoder 154, some embodiments may also include other types of encoders. For example, separate encoders could be trained, in a similar manner as the identity encoder 152 and the expression encoder 154 are trained, to encode different identity characteristics such as ethnicity, age, BMI, etc. Thereafter, such encoders can be used to control the identity characteristics in representations of faces generated by the face model 150.

In sum, techniques are disclosed for training and applying nonlinear face models. In some embodiments, a nonlinear face model includes an identity encoder, an expression encoder, and a decoder. The identity encoder takes as input a representation of a facial identity, such as a neutral face mesh minus a reference mesh, and outputs a code associated with the facial identity. The expression encoder takes as input a representation of a facial expression, such as a set of blendweights, and outputs a code associated with the facial expression. The codes associated with the facial identity and the facial expression can be concatenated and input into the decoder, which outputs a representation of a face having the facial identity and expression. The representation of the face can include vertex displacements for deforming the reference mesh. The nonlinear face model can be used in various applications, including generating novel faces or expressions and facial performance retargeting based on blendweights or 2D facial landmarks.

At least one technical advantage of the disclosed techniques relative to the prior art is that the disclosed techniques disentangle the notions of facial identity and facial expression using separate facial identity and expression encoders. This architectural approach allows facial identities and expressions to be separately controlled by a user when generating faces using a nonlinear model that includes the facial identity and expression encoders. In addition, the disclosed techniques can be used to generate faces that are more realistic-looking than faces generated by conventional approaches that implement linear-based techniques. These technical advantages represent one or more technological improvements over prior art approaches.

1. In some embodiments, a computer-implemented method for generating a representation of a face comprises receiving a representation of a facial identity and a representation of a facial expression, and performing one or more decoding operations based on an encoded representation of the facial identity and an encoded representation of the facial expression to generate a representation of a face having the facial identity and the facial expression.

2. The computer-implemented method of clause 1, wherein the representation of the facial identity includes a mesh of a face having a neutral expression, and the method further comprises generating the encoded representation of the facial identity by subtracting, from the mesh of the face, a reference mesh of a face to determine a set of differences between the mesh of the face and the reference mesh, and encoding the set of differences to generate the encoded representation of the facial identity.

3. The computer-implemented method of clauses 1 or 2, wherein the representation of the facial identity comprises the encoded representation of the facial identity.

4. The computer-implemented method of any of clauses 1-3, further comprising generating the encoded representation of the facial identity by adding noise to an encoded representation of another facial identity.

5. The computer-implemented method of any of clauses 1-4, wherein the representation of the facial expression includes one or more two-dimensional (2D) landmarks of facial features associated with an image depicting a face, and the method further comprises generating the encoded representation of the facial expression by mapping the one or more 2D landmarks to the encoded representation of the facial expression.

6. The computer-implemented method of any of clauses 1-5, wherein the representation of the facial expression includes one or more blendweight values, and the method further comprises performing one or more encoding operations based on the one or more blendweight values to generate the encoded representation of the facial expression.

7. The computer-implemented method of any of clauses 1-6, further comprising determining the one or more blendweight values based on one or more images.

8. The computer-implemented method of any of clauses 1-7, further comprising determining the one or more blendweight values based on one or more three-dimensional meshes.

9. The computer-implemented method of any of clauses 1-8, wherein the representation of the facial expression comprises the encoded representation of the facial expression.

10. The computer-implemented method of any of clauses 1-9, further comprising rendering at least one image based on the representation of the face.

11. In some embodiments, a non-transitory computer-readable storage medium includes instructions that, when executed by a processing unit, cause the processing unit to perform steps for generating a rendering of a face, the steps comprising receiving a representation of a facial identity and a representation of a facial expression, and processing an encoded representation of the facial identity and an encoded representation of the facial expression using a decoder to generate a representation of a face having the facial identity and the facial expression.

12. The computer-readable storage medium of clause 11, the steps further comprising processing the representation of the facial identity using a first variational autoencoder (VAE) encoder to generate the encoded representation of the facial identity, and processing the representation of the facial expression using a second VAE encoder to generate the encoded representation of the facial expression.

13. The computer-readable storage medium of clauses 11 or 12, wherein processing the encoded representation of the facial identity and the encoded representation of the facial expression using the decoder comprises concatenating the encoded representation of the facial identity and the encoded representation of the facial expression to generate an encoded representation of the facial identity and the facial expression, and inputting the encoded representation of the facial identity and the facial expression into the decoder.

14. The computer-readable storage medium of any of clauses 11-13, wherein the representation of the facial identity includes a mesh of a face having a neutral expression, and the steps further comprise generating the encoded representation of the facial identity by subtracting, from the mesh of the face, a reference mesh of a face to determine a set of differences between the mesh of the face and the reference mesh, and encoding the set of differences to generate the encoded representation of the facial identity.

15. The computer-readable storage medium of any of clauses 11-14, wherein the representation of the facial identity comprises the encoded representation of the facial identity, and the encoded representation of the facial identity is generated by adding noise to an encoded representation of another facial identity.

16. The computer-readable storage medium of any of clauses 11-15, wherein the representation of the facial expression includes one or more two-dimensional (2D) landmarks of facial features associated with an image depicting a face, and the steps further comprise generating the encoded representation of the facial expression by mapping the one or more 2D landmarks to the encoded representation of the facial expression.

17. The computer-readable storage medium of any of clauses 11-16, wherein the representation of the facial expression includes one or more blendweight values, and the steps further comprise performing one or more encoding operations based on the one or more blendweight values to generate the encoded representation of the facial expression.

18. The computer-readable storage medium of any of clauses 11-17, the steps further comprising receiving the one or more blendweight values via a user interface, or determining the one or more blendweight values based on at least one image or three-dimensional mesh.

19. The computer-readable storage medium of any of clauses 11-18, the steps further comprising rendering at least one image based on the representation of the face.

20. In some embodiments, a computer-implemented method of training a model for generating faces comprises receiving a data set that includes meshes of neutral faces and meshes of faces having expressions, and training a model based on the data set, wherein the model comprises a first encoder that maps representations of neutral faces to encoded representations of facial identities, a second encoder that maps representations of facial expressions to encoded representations of the facial expressions, and a decoder that maps encoded representations of facial identities and encoded representations of facial expressions to representations of faces.

21. The computer-implemented method of clause 20, wherein training the model based on the data set comprises subtracting each of the meshes of neutral faces from a reference mesh to determine a respective set of differences, and determining a respective set of blendweight values corresponding to a facial expression in each of the meshes of faces having expressions, and the model is trained based on the sets of differences and the sets of blendweight values.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a representation of a face, the computer-implemented method comprising:
   receiving a representation of a facial identity and a representation of a facial expression;
   processing the representation of the facial identity using a first variational autoencoder (VAE) encoder to generate an encoded representation of the facial identity;
   processing the representation of the facial expression using a second VAE encoder to generate an encoded representation of the facial expression; and
   performing one or more decoding operations based on the encoded representation of the facial identity and the encoded representation of the facial expression to generate the representation of the face having the facial identity and the facial expression.

2. The computer-implemented method of claim 1, wherein the representation of the facial identity includes a mesh of the face having a neutral expression, and the computer-implemented method further comprises generating the encoded representation of the facial identity by:
   subtracting a reference mesh from the mesh of the face to determine a set of differences between the mesh of the face and the reference mesh; and
   encoding the set of differences to generate the encoded representation of the facial identity.

3. The computer-implemented method of claim 1, wherein the representation of the facial identity comprises the encoded representation of the facial identity.

4. The computer-implemented method of claim 1, further comprising generating the encoded representation of the facial identity by adding noise to an encoded representation of another facial identity.

5. The computer-implemented method of claim 1, wherein the representation of the facial expression includes one or more two-dimensional (2D) landmarks of facial features associated with an image depicting the face, and
   the computer-implemented method further comprises generating the encoded representation of the facial expression by mapping the one or more 2D landmarks to the encoded representation of the facial expression.

6. The computer-implemented method of claim 1, wherein the representation of the facial expression includes one or more blendweight values, and the computer-implemented method further comprises performing one or more encoding operations based on the one or more blendweight values to generate the encoded representation of the facial expression.

7. The computer-implemented method of claim 6, further comprising determining the one or more blendweight values based on one or more images.

8. The computer-implemented method of claim 6, further comprising:
   receiving the one or more blendweight values via a user interface; or
   determining the one or more blendweight values based on one or more three-dimensional meshes.

9. The computer-implemented method of claim 1, wherein the representation of the facial expression comprises the encoded representation of the facial expression.

10. The computer-implemented method of claim 1, further comprising rendering at least one image based on the representation of the face.

11. A non-transitory computer-readable storage medium including instructions that, when executed by a processing unit, cause the processing unit to perform steps for generating a representation of a face, the steps comprising:
    receiving a representation of a facial identity and a representation of a facial expression;
    processing the representation of the facial identity using a first variational autoencoder (VAE) encoder to generate an encoded representation of the facial identity; and
    processing the representation of the facial expression using a second VAE encoder to generate an encoded representation of the facial expression; and
    processing the encoded representation of the facial identity and the encoded representation of the facial expression using a decoder to generate the representation of the face having the facial identity and the facial expression.

12. The non-transitory computer-readable storage medium of claim 11 wherein the representation of the face includes one or more vertex displacements for deforming a reference mesh.

13. The computer-readable storage medium of claim 11, wherein processing the encoded representation of the facial identity and the encoded representation of the facial expression using the decoder comprises:
    concatenating the encoded representation of the facial identity and the encoded representation of the facial expression to generate an encoded representation of the facial identity and the facial expression; and
    inputting the encoded representation of the facial identity and the facial expression into the decoder.

14. The computer-readable storage medium of claim 11, wherein the representation of the facial identity includes a mesh of the face having a neutral expression, and the steps further comprise generating the encoded representation of the facial identity by:

subtracting a reference mesh from the mesh of the face, the to determine a set of differences between the mesh of the face and the reference mesh; and encoding the set of differences to generate the encoded representation of the facial identity.

15. The computer-readable storage medium of claim 11, wherein the representation of the facial identity comprises the encoded representation of the facial identity, and the encoded representation of the facial identity is generated by adding noise to an encoded representation of another facial identity.

16. The computer-readable storage medium of claim 11, wherein the representation of the facial expression includes one or more two-dimensional (2D) landmarks of facial features associated with an image depicting the face, and the steps further comprise generating the encoded representation of the facial expression by mapping the one or more 2D landmarks to the encoded representation of the facial expression.

17. The computer-readable storage medium of claim 11, wherein the representation of the facial expression includes one or more blendweight values, and the steps further comprise performing one or more encoding operations based on the one or more blendweight values to generate the encoded representation of the facial expression.

18. The computer-readable storage medium of claim 17, the steps further comprising:

receiving the one or more blendweight values via a user interface; or determining the one or more blendweight values based on at least one image or three-dimensional mesh.

19. The computer-readable storage medium of claim 11, the steps further comprising rendering at least one image based on the representation of the face.

20. A computer-implemented method of training a model for generating a representation of a face, the computer-implemented method comprising:

receiving a data set that includes meshes of neutral faces that respectively represent a face having a neutral expression and meshes of faces that respectively represent a face having a facial expression; and training a model based on the data set, wherein the model comprises:

a first variational autoencoder (VAE) encoder configured to map representations of neutral faces to encoded representations of facial identities, a second VAE encoder configured to map representations of faces having facial expressions to encoded representations of the facial expressions, and a decoder configured to map encoded representations of facial identities and encoded representations of facial expressions to representations of faces.

21. The computer-implemented method of claim 20, wherein training the model based on the data set comprises:

subtracting a reference mesh from each of the meshes of neutral faces to determine a respective set of differences;

determining a respective set of blendweight values corresponding to a facial expression in each of the meshes of faces having facial expressions; and training the model based on the sets of differences and the sets of blendweight values.

\* \* \* \* \*

UNITED STATES PATENT AND TRADEMARK OFFICE
CERTIFICATE OF CORRECTION

PATENT NO. : 11,276,231 B2
APPLICATION NO. : 16/809495
DATED : March 15, 2022
INVENTOR(S) : Chandran et al.

Page 1 of 1

It is certified that error appears in the above-identified patent and that said Letters Patent is hereby corrected as shown below:

On the Title Page

(56) References Cited:

Page 2, Column 1, Line 10, Please delete "BLanz et al., "Exchanging Faces in Images" Computer Graphics Forum, Eurographics, vol. 23, 2004, No. 3, 8 pages." and insert --Blanz et al., "Exchanging Faces in Images" Computer Graphics Forum, Eurographics, vol. 23, 2004, No. 3, 8 pages.--;

Page 2, Column 2, Line 57, Please delete "Maruniec et al., "High-Resolution Neural Face Swapping for Visual Effects", Computer Graphics Forum, vol. 39, No 1, DOI: 10 1111/cgf.14062, 2020, pp. 173-184." and insert --Naruniec et al., "High-Resolution Neural Face Swapping for Visual Effects", Computer Graphics Forum, vol. 39, No 4, DOI: 10.1111/cgf.14062, 2020, pp. 173-184.--;

Page 2, Column 2, Line 60, Please delete "Mirkin et al., "FSGAN: Subject Agnostic Face Swapping and Reenactment", In Proceedings of the IEEE International Conference on Computer Vision, 2019, pp. 7184-7193." and insert --Nirkin et al., "FSGAN: Subject Agnostic Face Swapping and Reenactment", In Proceedings of the IEEE International Conference on Computer Vision, 2019, pp. 7184-7193.--;

Page 2, Column 2, Line 63, Please delete "Mirkin et al., "On Face Segmentation, Face Swapping, and Face Perception", 13th IEEE International Conference on Automatic Face & Gesture Recognition, DO110 1109/FG.2018 00024, 2018, pp. 98-105." and insert --Nirkin et al., "On Face Segmentation, Face Swapping, and Face Perception", 13th IEEE International Conference on Automatic Face & Gesture Recognition, DOI 10.1109/FG.2018.00024, 2018, pp.98-105.--;

In the Claims

Column 23, Claim 14, Line 5, please delete "the" before to.

Signed and Sealed this
Seventh Day of June, 2022

Katherine Kelly Vidal
*Director of the United States Patent and Trademark Office*